(12) United States Patent
Hayashi

(10) Patent No.: US 11,660,955 B2
(45) Date of Patent: May 30, 2023

(54) FUEL TANK OF WORK VEHICLE AND WORK VEHICLE

(71) Applicant: KUBOTA CORPORATION, Osaka (JP)

(72) Inventor: Takaya Hayashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 259 days.

(21) Appl. No.: 16/808,908

(22) Filed: Mar. 4, 2020

(65) Prior Publication Data
US 2020/0298698 A1 Sep. 24, 2020

(30) Foreign Application Priority Data

Mar. 18, 2019 (JP) ................................ JP2019-49832
Mar. 18, 2019 (JP) ................................ JP2019-49833

(51) Int. Cl.
*B60K 15/063* (2006.01)
*B60K 15/03* (2006.01)

(52) U.S. Cl.
CPC .. *B60K 15/063* (2013.01); *B60K 2015/03118* (2013.01); *B60K 2015/03473* (2013.01)

(58) Field of Classification Search
CPC ........ B60K 15/063; B60K 2015/03118; B60K 2015/03473; B60K 13/04; B60K 15/077; B60K 2015/03111; B60Y 2200/221
USPC ........................................................ 180/314
See application file for complete search history.

(56) References Cited

U.S. PATENT DOCUMENTS

| | | | | |
|---|---|---|---|---|
| 2,840,147 | A * | 6/1958 | Almestad ............... | B60K 15/06 137/590 |
| 4,288,086 | A * | 9/1981 | Oban .................... | B60K 15/063 137/571 |
| 4,858,959 | A | 8/1989 | Parrow | |
| 5,979,417 | A * | 11/1999 | Hyodo ................... | B60K 15/03 123/518 |
| 9,267,268 | B2 * | 2/2016 | Arai ........................ | E02F 3/764 |

(Continued)

FOREIGN PATENT DOCUMENTS

| CN | 101670780 A | * | 3/2010 |
|---|---|---|---|
| CN | 101670780 A | | 3/2010 |

(Continued)

OTHER PUBLICATIONS

Merriam Webster Dictionary, definition of "Side", retrieved from URL https://www.merriam-webster.com/dictionary/side on Feb. 24, 2022 (Year: 2022).*

(Continued)

*Primary Examiner* — Jennifer Robertson
*Assistant Examiner* — Eric C Baldrighi
(74) *Attorney, Agent, or Firm* — Buchanan Ingersoll & Rooney PC

(57) ABSTRACT

Provided is a fuel tank of a work vehicle in which fuel can be easily sucked into an engine. The fuel tank includes: a drain port which is open to an outside on a side surface and through which fuel is discharged to the outside; a suction port which is open to the outside on a side surface and has a center positioned lower than a center of the drain port and through which the fuel is sucked by an engine; and a first recess which is formed to be recessed downward with respect to a bottom surface and communicates with the drain port.

17 Claims, 17 Drawing Sheets

(56) References Cited

U.S. PATENT DOCUMENTS

| | | | | |
|---|---|---|---|---|
| 9,803,533 | B2 * | 10/2017 | Nagano | F01N 3/2066 |
| 11,007,869 | B2 * | 5/2021 | Kurokawa | F01N 3/2066 |
| 2005/0109685 | A1 | 5/2005 | Fujita et al. | |
| 2013/0284752 | A1 * | 10/2013 | Rund | B60K 15/04 |
| | | | | 220/660 |
| 2013/0292386 | A1 | 11/2013 | Klauer et al. | |
| 2014/0124284 | A1 | 5/2014 | Sekiya et al. | |
| 2016/0369757 | A1 * | 12/2016 | Aso | B60K 15/03 |
| 2019/0299773 | A1 * | 10/2019 | Kobayashi | B60K 15/035 |
| 2020/0031222 | A1 * | 1/2020 | Kurokawa | B60K 15/063 |
| 2020/0072172 | A1 * | 3/2020 | Higashiyama | F02M 37/0052 |

FOREIGN PATENT DOCUMENTS

| | | | | |
|---|---|---|---|---|
| CN | 106314132 | A | | 1/2017 |
| CN | 105984332 | B * | 11/2018 | ............. B60K 15/03 |
| EP | 2752327 | A1 * | 7/2014 | ................ B60P 1/04 |
| EP | 2752327 | A1 | | 7/2014 |
| FR | 2978418 | A1 * | 2/2013 | ............. B62K 11/00 |
| JP | S6393221 | U | | 6/1988 |
| JP | H0393441 | U | | 9/1991 |
| JP | H08132897 | A | | 5/1996 |
| JP | 2007263062 | A | | 10/2007 |
| JP | 2010144408 | A | | 7/2010 |
| JP | 2011190647 | A * | | 9/2011 |
| JP | 2015193992 | A | | 11/2015 |
| JP | 2017081259 | A | | 5/2017 |
| WO | 2006055896 | A2 | | 5/2006 |
| WO | 2014069026 | A1 | | 5/2014 |
| WO | WO-2021205499 | A1 * | | 10/2021 |

OTHER PUBLICATIONS

The extended European Search Report dated Jan. 22, 2021, by the European Patent Office in corresponding European Application No. 20163291.6. (9 pages).

Partial European Search Report dated Oct. 2, 2020, by the European Patent Office in corresponding European Application No. 20163291.6. (10 pages).

Office Action (Notice of Reasons for Refusal) dated Apr. 19, 2022, by the Japanese Patent Office in corresponding Japanese Patent Application No. 2019-049832, and an English Translation of the Office Action. (6 pages).

Office Action (Notice of Reasons for Refusal) dated Apr. 19, 2022, by the Japanese Patent Office in corresponding Japanese Patent Application No. 2019-049833, and an English Translation of the Office Action. (8 pages).

* cited by examiner

FUEL TANK OF WORK VEHICLE AND WORK VEHICLE

TECHNICAL FIELD

The disclosure relates to a technique of a fuel tank provided with a suction port through which fuel is sucked into an engine and a work vehicle.

BACKGROUND ART

Conventionally, the technique of a fuel tank provided with a suction port through which fuel is sucked into an engine and a work vehicle has been known. For example, the technique is described in JP 2005-343220 A.

A riding lawn mower (work vehicle) described in JP 8-132897 A is configured to be able to suck fuel in a fuel tank through a suction pipe inserted through a suction port.

The suction port described in JP 8-132897 A is formed at the upper end portion of the fuel tank. Therefore, when sucking the fuel in the fuel tank, it is necessary to suck up the fuel from the vicinity of the bottom to the upper end portion of the fuel tank. Thus, the technique described in JP 8-132897 A has room for improvement in that it is difficult to suck fuel.

SUMMARY OF INVENTION

The disclosure has been made in view of the above situation, and the object of the disclosure is to provide a fuel tank of a work vehicle and a work vehicle in which fuel can be easily sucked into an engine.

The problem to be solved by the disclosure is as described above. Next, a unit for solving the problem will be described.

A fuel tank of a work vehicle of the disclosure includes: a drain port which is open to an outside on a side surface and through which fuel is discharged to the outside; and a suction port which is open to the outside on the side surface and has a center positioned lower than a center of the drain port and through which the fuel is sucked by an engine.

The fuel tank of the work vehicle of the disclosure further includes: a first recess which is formed to be recessed downward with respect to a bottom surface and communicates with the drain port.

In the fuel tank of the work vehicle of the disclosure, the center of the drain port is positioned at substantially the same height as the bottom surface.

The fuel tank of the work vehicle of the disclosure further includes: a second recess which is formed to be recessed downward with respect to the bottom surface and communicates with the suction port.

In the fuel tank of the work vehicle according to the disclosure, the center of the suction port is positioned at a position lower than the bottom surface.

In the fuel tank of the work vehicle of the disclosure, the first recess and the second recess communicate with each other so as not to generate a step on lower surfaces.

In the fuel tank of the work vehicle of the disclosure, the lower surface of the first recess and the lower surface of the second recess are formed to be parallel to a horizontal direction.

In the fuel tank of the work vehicle of the disclosure, the drain port and the suction port are formed on opposite side surfaces.

A work vehicle of the disclosure includes the fuel tank as claimed in any one of claims 1 to 8.

In the work vehicle of the disclosure, the fuel tank further includes a fuel drain portion which is connected to the drain port, is capable of discharging fuel to the outside, and is disposed on a surface facing one side, and the work vehicle further includes a urea water tank which is capable of discharging urea water to the outside and has a urea water drain portion disposed on the one side of the fuel tank.

In the work vehicle of the disclosure, the fuel drain portion and the urea water drain portion are disposed in front of a step disposed on one side of the fuel tank.

In the work vehicle of the disclosure, the fuel drain portion and the urea water drain portion are disposed such that height positions are different from each other.

In the work vehicle of the disclosure, the urea water drain portion is disposed above the fuel drain portion.

In the work vehicle of the disclosure, the fuel drain portion and the urea water drain portion are disposed such that positions in a right-left direction are different from each other.

In the work vehicle of the disclosure, the urea water drain portion is disposed on a lateral outside from the fuel drain portion.

In the work vehicle of the disclosure, the fuel drain portion and the urea water drain portion are disposed such that positions in a front-rear direction are different from each other.

In the work vehicle according to the disclosure, the urea water drain portion is disposed in front of the fuel drain portion.

In the work vehicle of the disclosure, the urea water drain portion is provided such that other members do not intervene below.

In the work vehicle of the disclosure, the fuel drain portion is disposed below the urea water tank and is disposed so as not to overlap with the urea water drain portion in bottom view.

In the work vehicle of the disclosure, the fuel drain portion is disposed on a surface facing a lateral outside.

The disclosure has the following effects.

In the fuel tank of the work vehicle according to the disclosure, the fuel can be easily sucked into the engine.

In the fuel tank of the work vehicle according to the disclosure, the fuel can be effectively discharged.

In the fuel tank of the work vehicle according to the disclosure, the fuel can be easily discharged.

In the fuel tank of the work vehicle according to the disclosure, the fuel can be more easily sucked into the engine.

In the fuel tank of the work vehicle according to the disclosure, the fuel can be effectively discharged from the drain port, and the fuel can be effectively sucked through the suction port.

In the fuel tank of the work vehicle according to the disclosure, it is possible to suppress impurities remaining around the drain port from being sucked when the fuel is sucked.

In the work vehicle of the disclosure, the fuel can be easily sucked into the engine.

In the work vehicle of the disclosure, the operation of discharging fuel and urea water can be easily performed.

In the work vehicle of the disclosure, the operation of discharging fuel and urea water can be performed more easily.

In the work vehicle of the disclosure, the fuel and the urea water can be prevented from being erroneously discharged.

In the work vehicle according to the disclosure, the urea water discharged from the urea water drain portion can be suppressed from being splashed on other members.

In the work vehicle of the disclosure, the fuel drain portion can be provided by utilizing the space below the urea water tank, so that the space can be effectively utilized.

In the work vehicle of the disclosure, the fuel drain portion can be opened from the lateral outside, and thus the operation of discharging the fuel can be performed more easily.

DESCRIPTION OF EMBODIMENT

Figure 1:
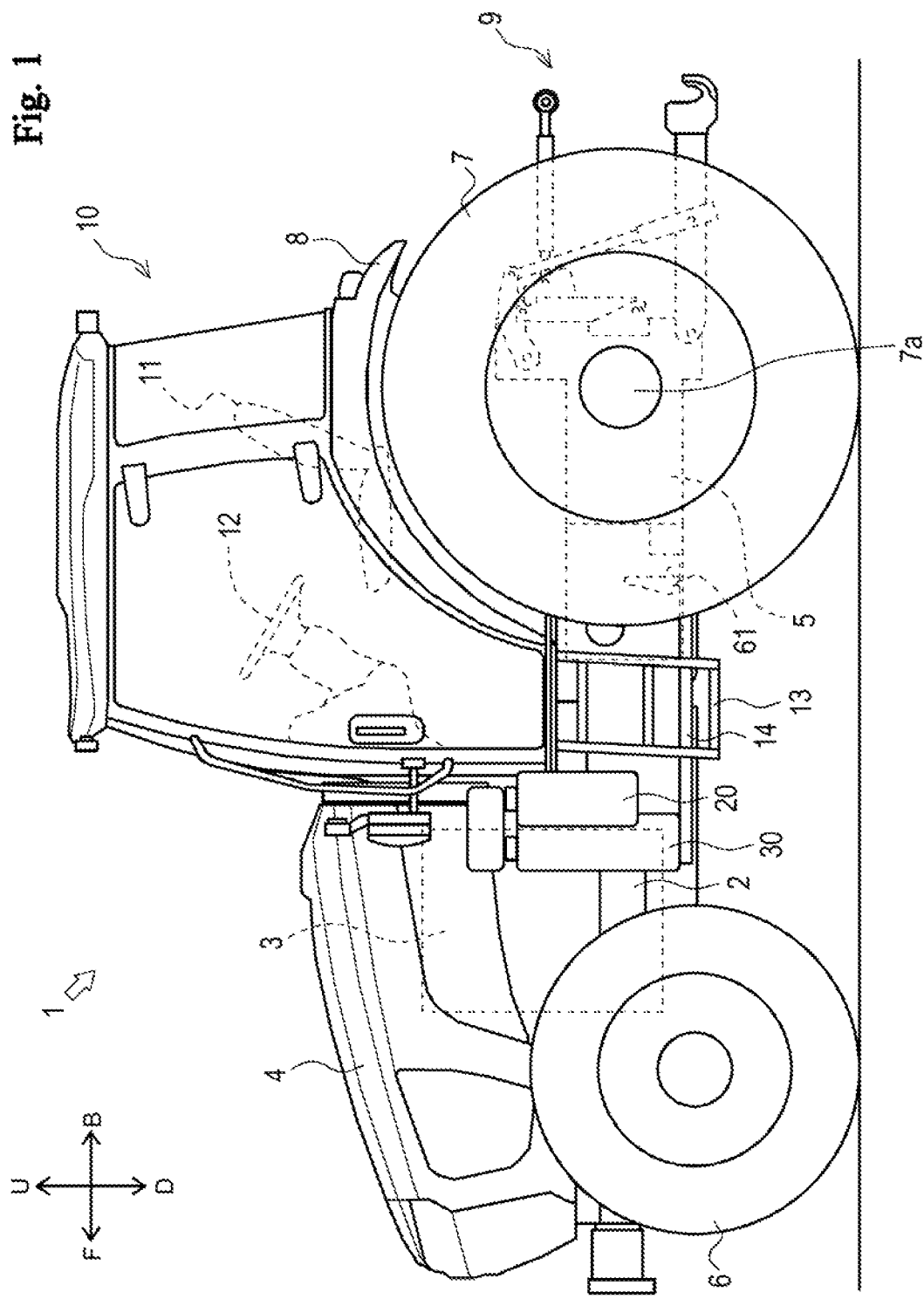
FIG. 1 is a side view illustrating an overall configuration of a tractor according to one embodiment of the disclosure.

In the following, a description is given with the directions indicated by arrows U, D, F, B, L and R in the drawing defined as upward, downward, forward, backward, leftward and rightward, respectively.

Hereinafter, a fuel tank 30 of a tractor 1 according to one embodiment of the disclosure will be described. First, the overall configuration of the tractor 1 will be described with reference to FIG. 1.

The tractor 1 mainly includes a body frame 2, an engine 3, a hood 4, a transmission case 5, front wheels 6, rear wheels 7, a fender 8, a lifting device 9, a cabin 10, a seat 11, a steering wheel 12, steps 13, a urea water tank 20, a fuel tank 30, a mounting frame 14, and the like.

The body frame 2 is a frame-shaped member formed by appropriately combining a plurality of panel members. The body frame 2 is formed in a substantially rectangular shape in plan view. The body frame 2 is disposed at the front portion of the tractor 1 with the longitudinal direction extending in the front-rear direction. The engine 3 is fixed to the rear portion of the body frame 2. The engine 3 is covered by the hood 4. A transmission case 5 is fixed to the rear portion of the engine 3.

The front portion of the body frame 2 is supported by a pair of right and left front wheels 6 via a front axle mechanism (not illustrated). The rear portion of the transmission case 5 is supported by a pair of right and left rear wheels 7 via a rear axle mechanism (not illustrated). The pair of right and left rear wheels 7 is covered mostly with the fender 8 from above.

The rear portion of the transmission case 5 is provided with the lifting device 9. The lifting device 9 can be mounted with various work devices (for example, a cultivator). The lifting device 9 can raise and lower the mounted work device by an actuator such as a hydraulic cylinder. The power of the engine 3 can be transmitted to the lifting device 9 through a PTO (Power-Take-Off) shaft (not illustrated).

After the power of the engine 3 is shifted by a transmission (not illustrated) housed in the transmission case 5, the power can be transmitted to the front wheels 6 through the front axle mechanism, and the power can be transmitted to the rear wheels 7 through the rear axle mechanism. The front wheels 6 and the rear wheels 7 are driven to rotate by the power of the engine 3, so that the tractor 1 can run. Further, the work device mounted on the lifting device 9 can be driven by the power of the engine 3.

The cabin 10 is provided behind the engine 3. A living space on which an operator boards is formed inside the cabin 10. The seat 11 for the operator to sit on is disposed at substantially the center of the cabin 10. The steering wheel 12 for adjusting the turning angle of the front wheels 6 is disposed at the front portion of the cabin 10. In addition, the steps 13 on which the operator puts his/her feet when getting on and off the cabin 10 are disposed at the lower left portion and lower right portion of the cabin 10. The urea water tank 20 and the fuel tank 30 are disposed in front of the left step 13. The fuel tank 30 is placed on the mounting frame 14 formed by appropriately combining panel members and the like.

Next, the urea water tank 20 and the fuel tank 30 will be described with reference to FIGS. 2 to 10.

Figure 2:
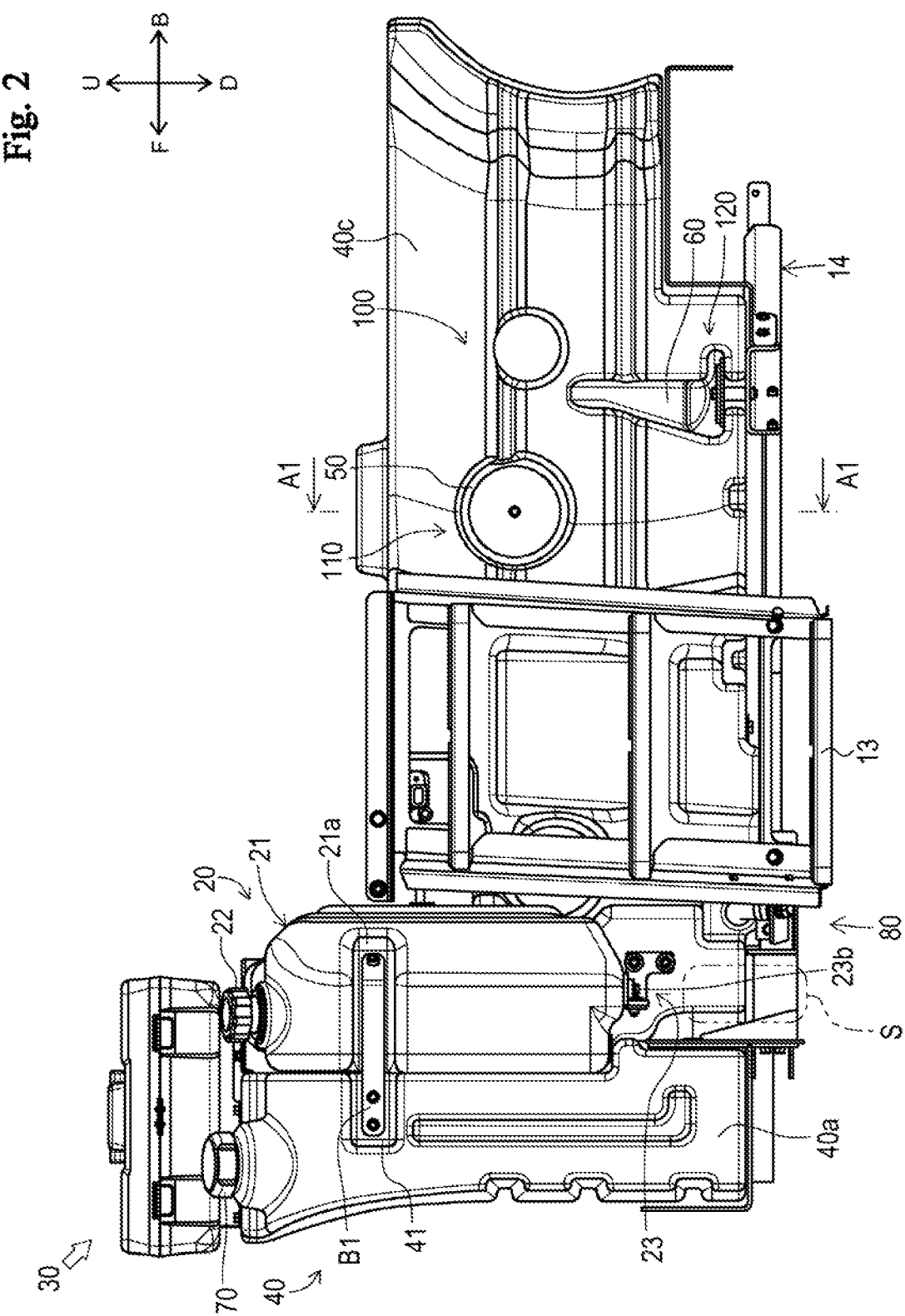
FIG. 2 is a side view illustrating a step, a urea water tank, and a fuel tank.
Figure 3:
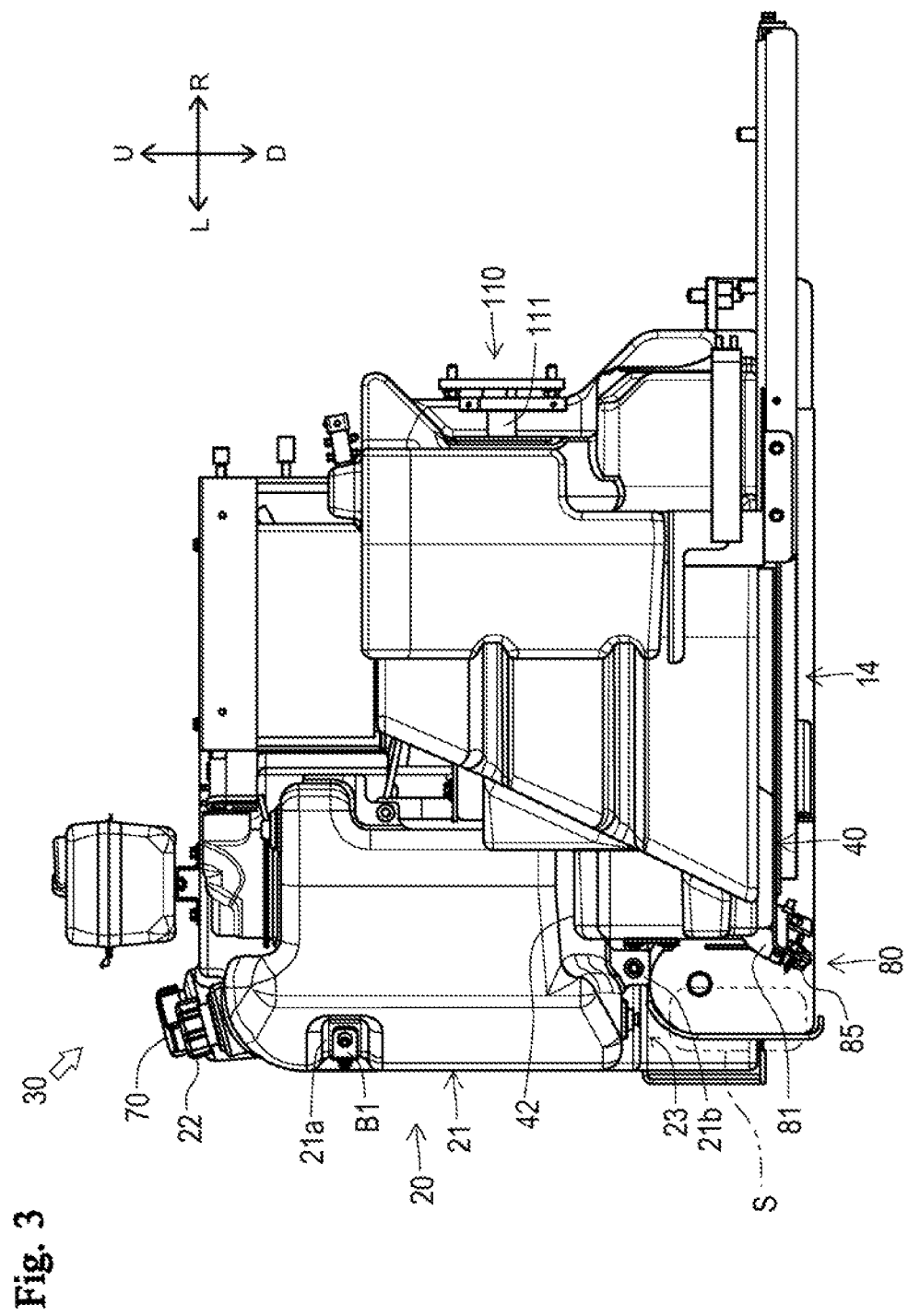
FIG. 3 is a rear view illustrating the urea water tank and the fuel tank.

The urea water tank 20 is for storing urea water. The urea water tank 20 is connected to an SCR (Selective Catalytic Reduction) (not illustrated) that converts nitrogen dioxide into water and nitrogen through a hose or the like. As illustrated in FIGS. 2 and 3, the urea water tank 20 includes a urea water tank body 21, a cap 22, and a drain portion 23.

Figure 4:
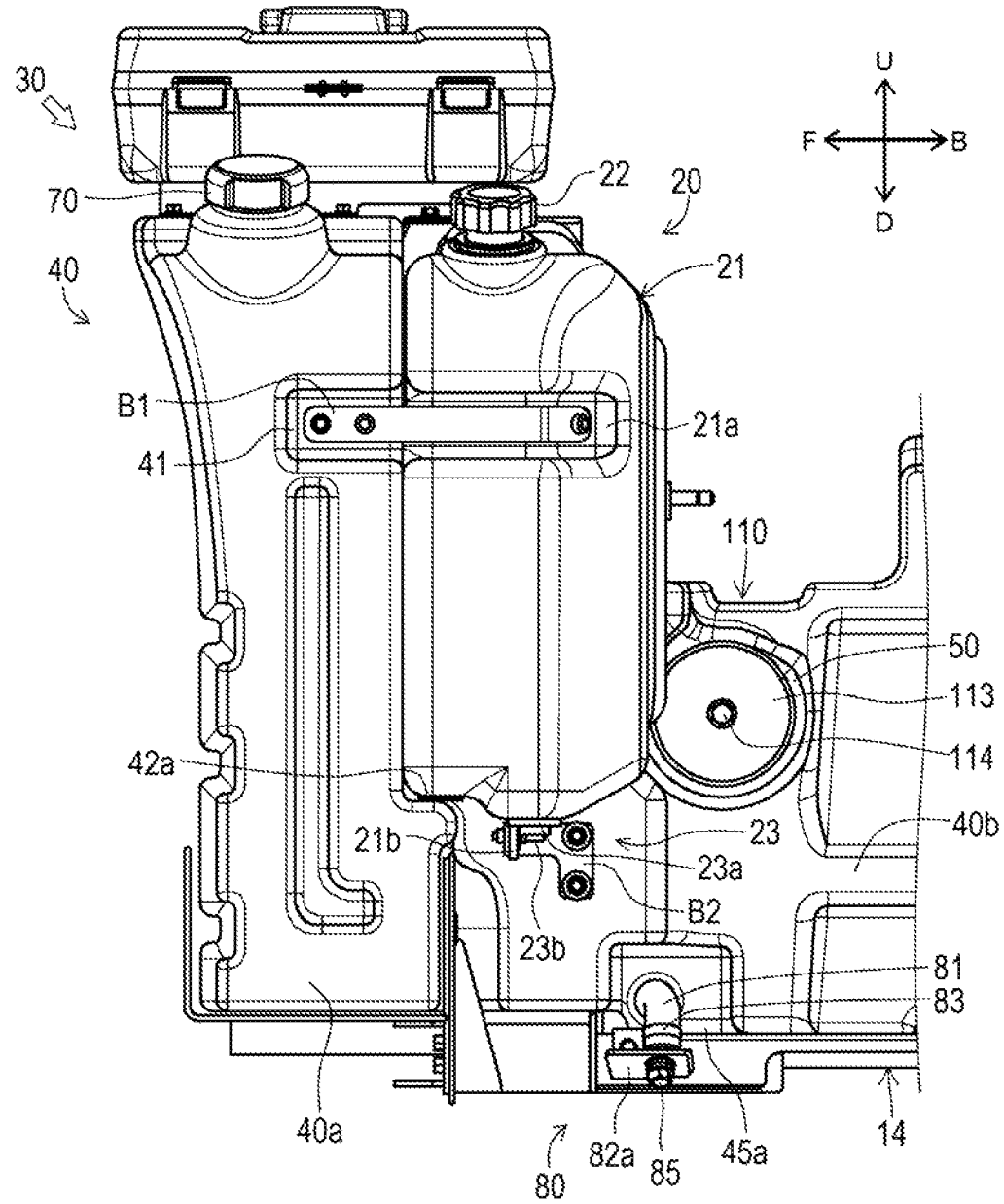
FIG. 4 is an enlarged side view of the same.

The urea water tank body 21 is a member formed in a hollow shape. The urea water tank body 21 is formed in a substantially rectangular shape in side view in which the longitudinal direction is directed in the vertical direction and the lateral direction is directed in the front-rear direction. As illustrated in FIGS. 3 and 4, the urea water tank body 21 includes a first mounting portion 21a and a second mounting portion 21b.

The first mounting portion 21a is a recess formed on the left side surface of the urea water tank body 21. The first mounting portion 21a is formed from the front end to the rear portion of the urea water tank 20.

The second mounting portion 21b is a substantially plate-shaped portion formed at the lower end portion of the urea water tank body 21. The second mounting portion 21b is disposed with the plate surface directed in the front-rear direction. The second mounting portion 21b is formed so as to protrude downward from the lower surface of the urea water tank body 21.

The cap 22 is opened and closed when supplying urea water to the urea water tank body 21. The cap 22 is provided on the upper surface of the urea water tank body 21.

The drain portion 23 is for discharging urea water from the urea water tank body 21. The drain portion 23 is provided on the lower surface of the urea water tank body

Figure 5:
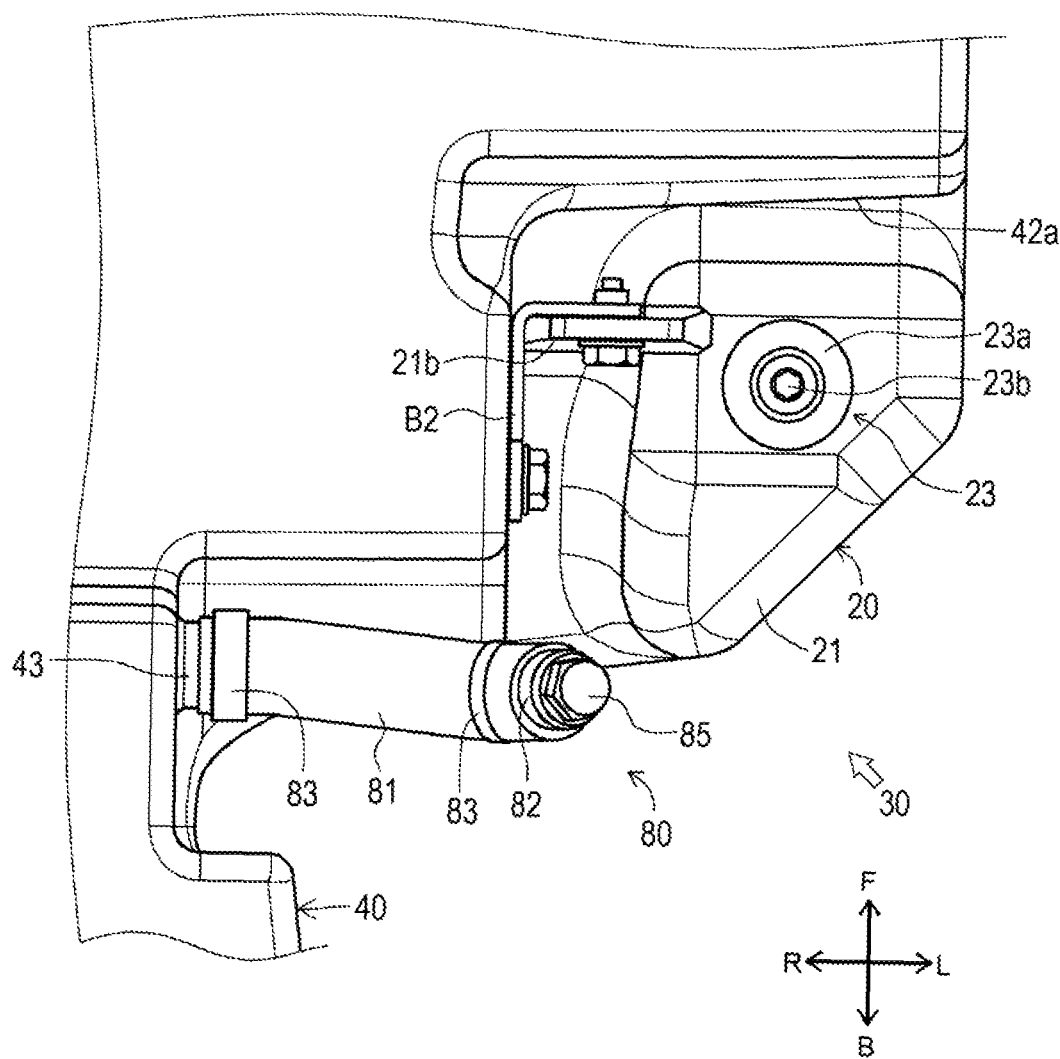
FIG. 5 is an enlarged bottom view of the same.

21. As illustrated in FIGS. 4 and 5, the drain portion 23 includes a receiving member 23a and a drain plug 23b.

The receiving member 23a is for receiving the drain plug 23b described later. The receiving member 23a is formed in a substantially annular shape in bottom view, and a female screw portion (not illustrated) is formed on the inner peripheral surface. The receiving member 23a is fixed to the lower surface of the urea water tank body 21 (left rearward of the second mounting portion 21b).

The drain plug 23b is opened when the urea water is discharged. The drain plug 23b is fastened to the female screw portion of the receiving member 23a.

The fuel tank 30 stores fuel. The fuel tank 30 is connected to the engine 3 through a hose or the like. The fuel tank 30 includes a fuel tank body 40, a cap 70, and a drain portion 80.

Figure 6:
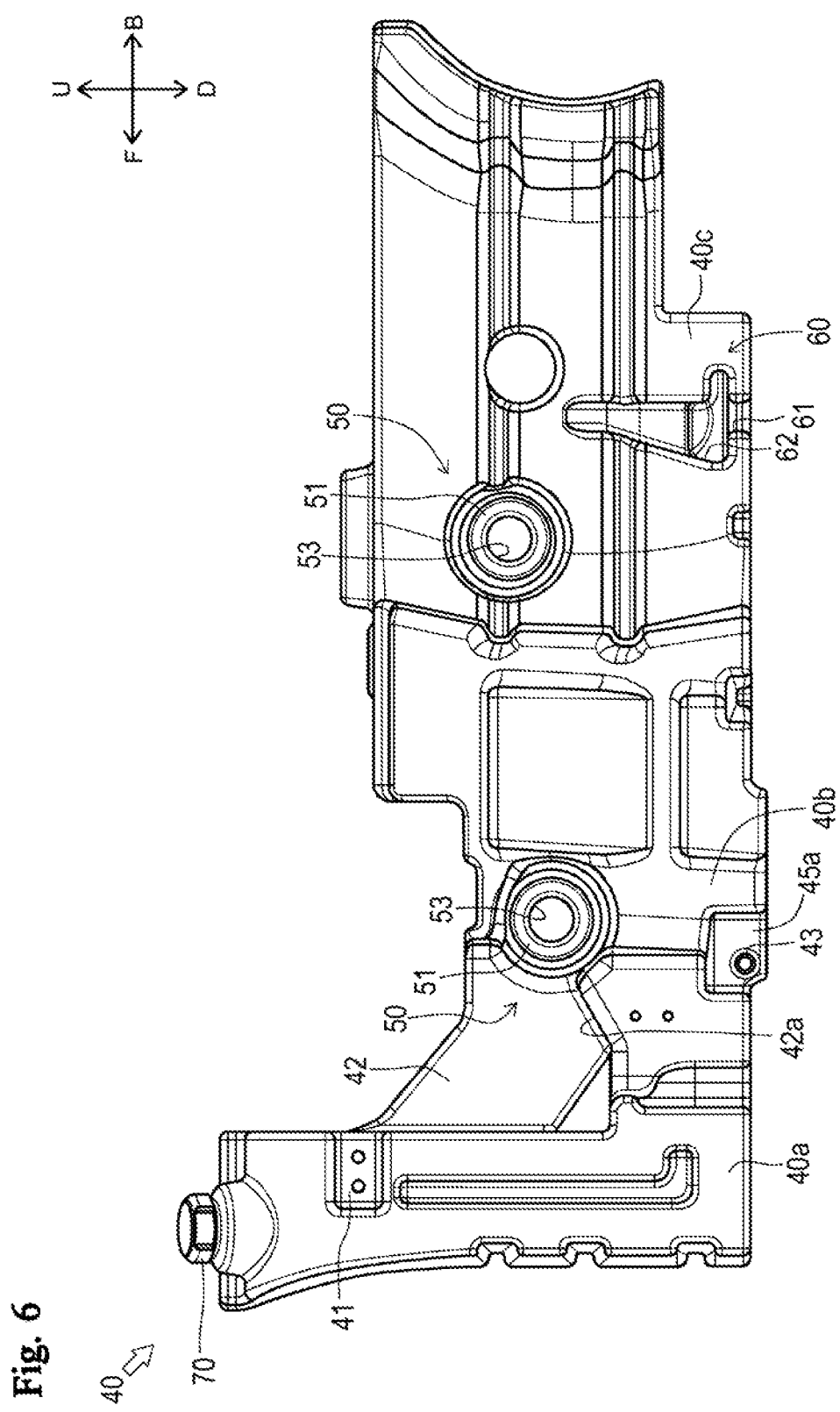
FIG. 6 is a side view illustrating a fuel tank body.
Figure 7:
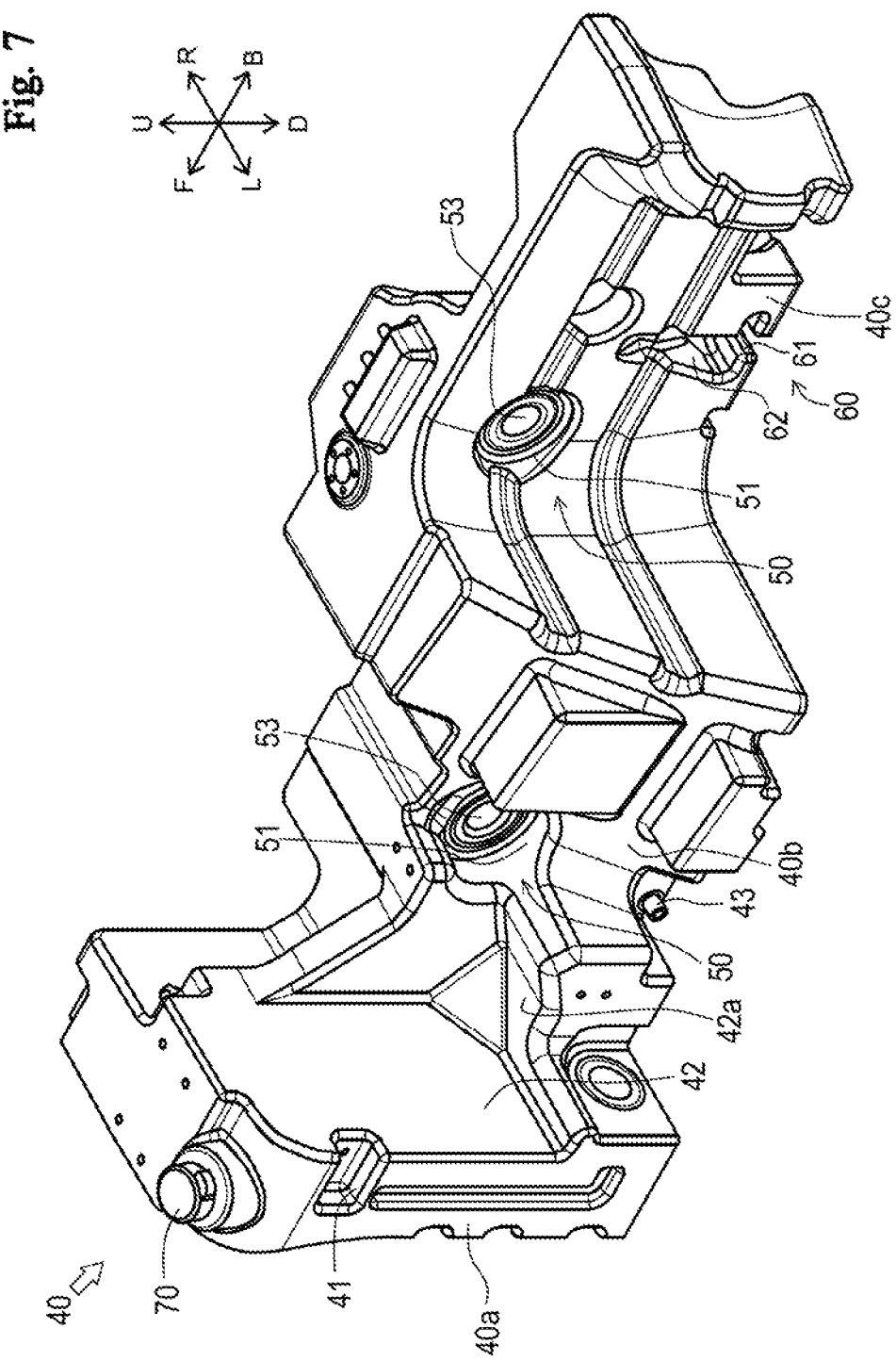
FIG. 7 is a rear perspective view of the same.
Figure 8:
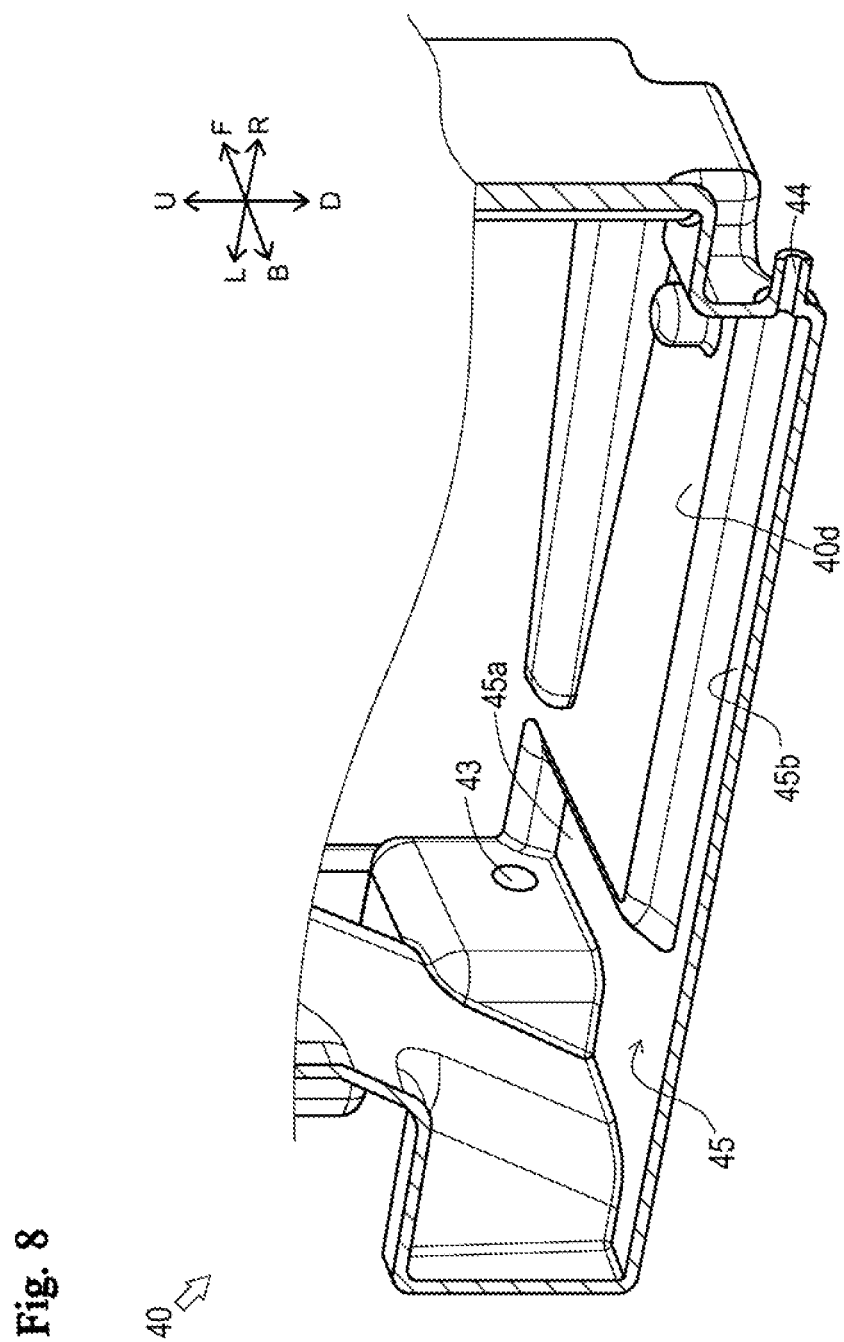
FIG. 8 is a perspective sectional view illustrating a drain port and a suction port.

The fuel tank body 40 illustrated in FIGS. 6 and 7 is a substantially hollow member that extends long in the front-rear direction. The front end portion of the fuel tank body 40 is formed so as to have the highest height in the fuel tank body 40. In the longitudinally middle portion of the fuel tank body 40, the left side surface is positioned on the right side from the front end portion. Further, the left side surface of the rear portion of the fuel tank body 40 is positioned on the right side from the longitudinally middle portion. As described above, the left side surface of the fuel tank body 40 is configured to be positioned stepwise to the right side toward the rear side. Hereinafter, in the fuel tank body 40, the left side surface at the front end portion is referred to as "first left side surface 40a," the left side surface at the longitudinally middle portion is referred to as "second left side surface 40b," and the left side surface at the rear portion is referred to as "third left side surface 40c." Such a fuel tank body 40 is formed by resin molding. As illustrated in FIGS. 7 and 8, the fuel tank body 40 includes a mounting portion 41, an installation portion 42, a drain port 43, a suction port 44, a connection recess 45, first fixed portions 50, and a second fixed portion 60.

The mounting portion 41 is a recess formed on the first left side surface 40a. The mounting portion 41 is formed from the longitudinally middle portion of the first left side surface 40a to the rear end.

The installation portion 42 is a portion for installing the urea water tank 20. The installation portion 42 is formed behind the mounting portion 41. The installation portion 42 is formed by appropriately recessing the fuel tank body 40 to be able to abut on the front side surface, the right side surface, and the lower surface of the urea water tank 20. The installation portion 42 includes a mounting surface 42a.

The mounting surface 42a is a lower surface of the installation portion 42. The mounting surface 42a is formed in a substantially L-shape in plan view such that the left end portion extends rightward and the extended end portion extends to the rear upper side. The urea water tank 20 is placed on the mounting surface 42a through a predetermined plate-shaped member (see FIG. 2).

The drain port 43 is an opening portion for discharging fuel from the fuel tank 30. The drain port 43 is formed in a substantially cylindrical shape protruding leftward from the lower end portion of the second left side surface 40b. The drain port 43 is disposed in the rear lower portion of the installation portion 42. Incidentally, the details of the position of the drain port 43 will be described later.

The suction port 44 illustrated in FIG. 8 is an opening portion for the engine 3 to suck the fuel in the fuel tank 30. The suction port 44 is formed in a substantially cylindrical shape protruding rightward from the right side surface of the fuel tank 30. The suction port 44 is formed in the lower end portion of the right side surface of the fuel tank 30. The front-rear position of the suction port 44 is positioned behind the drain port 43. The outer diameter of the suction port 44 is formed to be smaller than the outer diameter of the drain port 43. The inner diameter of the suction port 44 is formed to be smaller than the inner diameter of the drain port 43. A hose is externally fitted to such a suction port 44 (not illustrated). The suction port 44 is connected to the engine 3 through the hose and a fuel pump (not illustrated). When the fuel pump is driven, the fuel in the fuel tank 30 is sucked into the engine 3.

Figure 9:
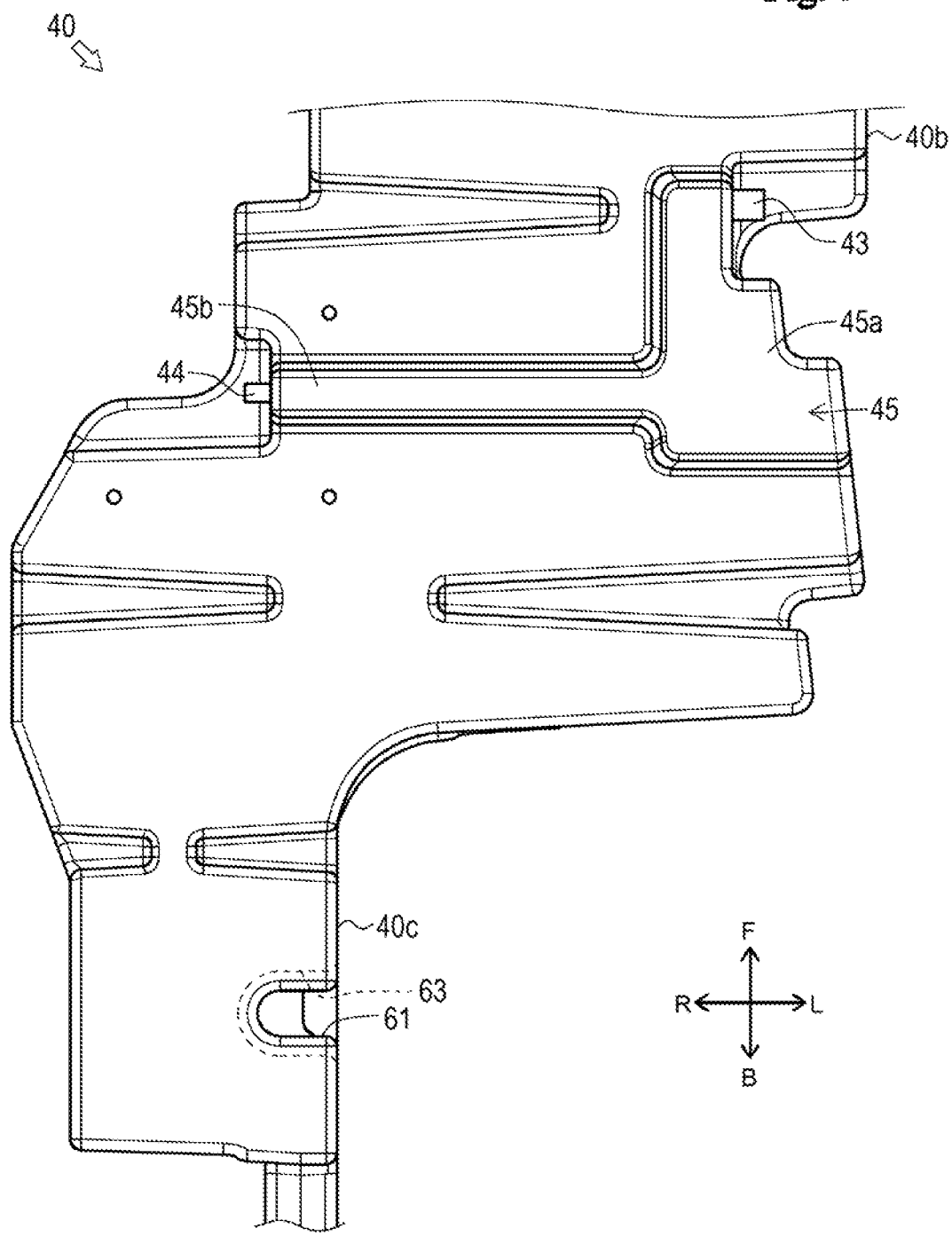
FIG. 9 is a bottom view of the same.

The connection recess 45 is a recess formed to extend from the drain port 43 to the suction port 44. The connection recess 45 is formed by recessing the bottom surface 40d (the surface facing upward in the inner inside) of the fuel tank body 40 downward. As illustrated in FIGS. 8 and 9, the connection recess 45 is formed in a substantially L-shape in bottom view to include a portion extending rearward from the drain port 43 and a portion extending leftward from the suction port 44. The connection recess 45 includes a first recess 45a and a second recess 45b.

The first recess 45a is a portion extending rearward from the drain port 43. The left end portion of the first recess 45a is formed along the inner surface of the fuel tank body 40. The first recess 45a is formed in a substantially stepped shape in bottom view along the step (the step when viewed from the bottom surface) of the fuel tank body 40. The upper surface (the surface facing upward in the inner side of the fuel tank body 40) and the lower surface (the surface facing downward in the outer side of the fuel tank body 40) of the first recess 45a are formed so as to be parallel with the front-rear direction and the right-left direction (horizontal direction). The front-rear position of the rear end portion of the first recess 45a is positioned behind the suction port 44.

The lower end of the inner peripheral surface of the drain port 43 according to this embodiment is formed to enter below such a first recess 45a (in the depth direction of the first recess 45a) (to be positioned lower than the upper end portion of the first recess 45a). Accordingly, the lower end of the inner peripheral surface of the drain port 43 is lower than the bottom surface 40d of the fuel tank body 40, and the drain port 43 communicates with the first recess 45a.

The second recess 45b is a portion extending leftward from the suction port 44. The second recess 45b is formed in a substantially rectangular shape in bottom view with the longitudinal direction extending in the right-left direction. The left end portion of the second recess 45b extends to the rear portion of the first recess 45a. Thus, the connection recess 45 is formed so as to extend from the left end portion to the right end portion of the fuel tank body 40. The upper surface (the surface facing upward in the inner side of the fuel tank body 40) and the lower surface (the surface facing downward in the outer side of the fuel tank body 40) of the second recess 45b are formed so as to be parallel with the front-rear direction and the right-left direction (horizontal direction). The second recess 45b is formed to have the same depth as the first recess 45a. Accordingly, the upper surface and the lower surface of the second recess 45b communicate with the upper surface and the lower surface of the first recess 45a so as to be flush.

The inner peripheral surface of the suction port 44 according to this embodiment is formed in such a second recess 45b. Accordingly, the lower end of the inner peripheral surface of the suction port 44 is lower than the bottom surface 40d of the fuel tank body 40, and the suction port 44 communicates with the second recess 45b.

The first fixed portion 50 illustrated in FIGS. 6 and 7 is a portion fixed by a first fixing portion 110 of the fixing structure 100 described later. The second fixed portion 60 is a portion fixed by a second fixing portion 120 of the fixing structure 100 described later. The first fixed portion 50 and the second fixed portion 60 will be described later.

The cap 70 opens and closes when fuel is supplied to the fuel tank body 40. The cap 70 is provided on the upper surface at the front end portion of the fuel tank body 40.

Figure 10:
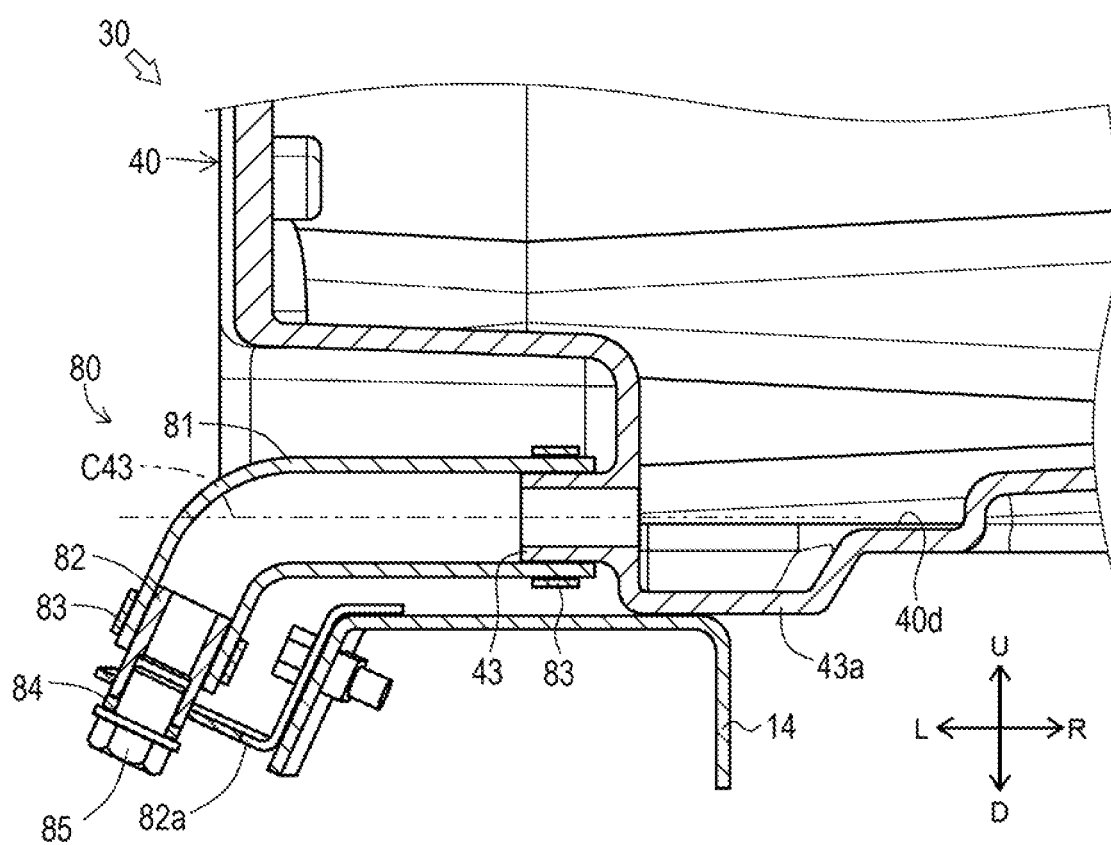
FIG. 10 is a rear sectional view illustrating the drain portion of the fuel tank.

The drain portion 80 illustrated in FIGS. 4 and 5 is for discharging fuel from the fuel tank body 40. The drain portion 80 is provided on the second left side surface 40b of the fuel tank body 40. The drain portion 80 is disposed on the lower right rear side of the drain portion 23 of the urea water tank 20. The drain portion 80 and the drain portion 23 of the urea water tank 20 are disposed above the lower end of the mounting frame 14 (see FIGS. 4 and 10). As illustrated in FIGS. 5 and 10, the drain portion 80 includes a drain hose 81, a receiving member 82, a band 83, a washer 84, and a drain plug 85.

The drain hose 81 guides fuel from the drain port 43. The drain hose 81 is formed such that the right end portion extends leftward and the extended end portion extends to the lower left side. The drain hose 81 is connected to the drain port 43 and the receiving member 82 described later. The drain hose 81 is made of rubber.

The receiving member 82 is for receiving the drain plug 85 described later. The receiving member 82 is formed in a substantially cylindrical shape having the outer diameter substantially equal to the inner diameter of the drain hose 81. The receiving member 82 is disposed such that the axial direction is directed to the upper right side (lower left side). A female screw portion is formed on the inner peripheral surface of the lower left portion of the receiving member 82. The upper right portion of the receiving member 82 is inserted into the lower left end portion of the drain hose 81. The receiving member 82 is made of a metal material. The receiving member 82 is fixed to the mounting frame 14 via a bracket 82a having a substantially L-shape in rear view.

The band 83 is for binding the drain hose 81. The band 83 reduces the diameter of the drain hose 81 at the connection portion (right end portion) of the drain hose 81 with the drain port 43 and at the connection portion (lower left end portion) of the drain hose 81 with the receiving member 82. Accordingly, the band 83 elastically deforms (crushes) the drain hose 81 to fix the drain hose to the drain port 43 and the receiving member 82.

The washer 84 is provided between the receiving member 82 and the drain plug 85. The washer 84 is formed of a rubber-attached washer having a rubber washer on the inner peripheral side.

The drain plug 85 is opened when fuel is discharged from the fuel tank body 40. The drain plug 85 is fastened to the female screw portion of the receiving member 82. Accordingly, the drain plug 85 elastically deforms the rubber of the washer 84 and is fixed to the receiving member 82 in a state of being in close contact with the rubber.

As described above, the drain portion 80 according to this embodiment elastically deforms the rubber material (the drain hose 81 and the washer 84), and constantly applies pressure to the rubber material. Thus, it is possible to prevent that a gap is formed between the rubber material (the drain hose 81 and the washer 84), the receiving member 82, and the drain plug 85, and it is possible to effectively suppress fuel leakage.

A cover (not illustrated) for protecting the drain portion 80 is detachably provided around the drain portion 80 configured as above. Also, a cover (not illustrated) for protecting the drain plug 23b is provided detachably around the drain plug 23b of the urea water tank 20.

As illustrated in FIGS. 3 to 5, the urea water tank 20 is fixed to the fuel tank 30 configured as described above through the first connection member B1 and the second connection member B2. Specifically, portions (the right end portion and the front end portion) of the lower surface of the urea water tank 20 are placed on the mounting surface 42a of the installation portion 42. Another portion (rear left portion) of the lower surface of the urea water tank 20 is disposed to face the ground without overlapping the fuel tank 30 in bottom view. The first mounting portion 21a formed on the left side surface of the urea water tank 20 is disposed to be aligned with the mounting portion 41 of the fuel tank 30 in the front-rear direction. The first connection member B1 is disposed to extend over the first mounting portion 21a and the mounting portion 41 and is fixed to the urea water tank 20 and the fuel tank 30. Further, the second connection member B2 has a rear end portion fixed to the fuel tank 30 and a front end portion fixed to the second mounting portion 21b of the urea water tank 20.

The urea water tank 20 fixed in this manner is disposed to the left side of the fuel tank 30 (second left side surface 40b). Further, the drain portion 23 of the urea water tank 20 is disposed on the left rear side (the portion of which the lower side is not formed with the fuel tank 30 (second left side surface 40b)) of the mounting surface 42a. In this way, as illustrated in FIGS. 2 and 3, a discharge space S is formed which is partitioned by the lower surface of the urea water tank 20 and the fuel tank 30 and guides the urea water from the drain portion 23 downward.

The urea water tank 20 is disposed on the left side (lateral outside) of the hood 4 and the cabin 10 (see FIG. 1). Further, the cap 70 and the drain portion 80 of the fuel tank 30 are also disposed on the left side (lateral outside) of the hood 4 and the cabin 10.

Hereinafter, the operation of discharging the urea water and the fuel will be described.

When the urea water is discharged, the operator removes the cover for protecting the drain plug 23b on the left side of the tractor 1 and opens the drain plug 23b illustrated in FIG. 2. Accordingly, the urea water flows to the lower side of the urea water tank 20 through the discharge space S. Thus, the operator can discharge the urea water.

When fuel is discharged, the operator removes the cover for protecting the drain portion 80 on the left side of the tractor 1 and opens the drain plug 85 illustrated in FIGS. 4 and 5. Accordingly, the fuel flows out substantially downward through the drain port 43 and the drain hose 81. Thus, the operator can discharge the fuel.

As described above, the urea water tank 20 (drain portion 23) is disposed on the left side of the fuel tank 30 (second left side surface 40b). Further, in the drain portion 80 of the fuel tank 30, the drain hose 81 is connected to the drain port 43 formed in the second left side surface 40b. In this way, when the drain portion 80 of the fuel tank 30 is disposed on the left side (the same side as the side on which the drain portion 23 of the urea water tank 20 is disposed), the operator can open the drain plugs 23b and 85 from the same side (left side). Further, since the drain portion 80 of the fuel tank 30 is not disposed on the lower surface of the fuel tank 30 but on the left side surface (second left side surface 40b), the operator can discharge fuel without reaching under the fuel tank 30. Accordingly, the operation of discharging fuel and urea water can be easily performed.

As illustrated in FIG. 2, the drain portions 23 and 80 of the urea water tank 20 and the fuel tank 30 are disposed in front of the step 13. In addition, as illustrated in FIG. 1, the urea water tank 20 and the fuel tank 30 are disposed behind the front wheels 6. Accordingly, the drain portions 23 and 80 can be collectively disposed between the front wheel 6 and the step 13 (a narrow range on the left side of the tractor 1). Accordingly, the distance between the drain portions 23 and 80 can be reduced, and thus the operation of discharging fuel and urea water can be performed more easily.

As described above, the drain portion 80 of the fuel tank 30 is disposed on the lower right rear side of the drain portion 23 of the urea water tank 20 (see FIGS. 3 and 4). In this way, when the front-rear position, the lateral position, and the height position of the drain portions 23 and 80 are shifted from each other, the drain portions 23 and 80 can be distinguished by the difference in position. Thus, it is possible to prevent fuel and urea water from being erroneously discharged. In particular, as in this embodiment, when a plurality of positions among the three positions of the front-rear position, the right-left position, and the height position are shifted, the drain portions 23 and 80 can be more reliably distinguished. Thus, it is possible to effectively prevent fuel and urea water from being erroneously discharged.

In this embodiment, urea water is discharged downward through the discharge space S illustrated in FIGS. 2 and 3. When the discharge space is secured in this manner, the urea water discharged from the drain portion 23 of the urea water tank 20 at a relatively high position (rather than the drain portion 80 of the fuel tank 30) can be suppressed from being splashed on other members.

In this embodiment, although the discharge space S is formed below the urea water tank 20, some members, specifically, the drain hose 81, the drain plug 85, the second connection member B2, and the like are disposed below the urea water tank 20. As illustrated in FIG. 5, the drain hose 81 and the drain plug 85 are disposed to overlap the rear end portion of the urea water tank 20 in bottom view. Further, the second connection member B2 is disposed to overlap the right portion (the right side of the drain portion 23) of the urea water tank 20 in bottom view. As described above, when some members (such as the drain hose 81) is disposed so as not to overlap with the drain portion 23 of the urea water tank 20, the space below the urea water tank 20 can be utilized as the installation space of the some members, and urea water can be suppressed from being splashed on the some members. Accordingly, the space below the urea water tank 20 can be effectively utilized.

As described above, the urea water tank 20 (drain portion 23) is disposed on the left side of the cabin 10. Further, the drain portion 80 of the fuel tank 30 is also disposed on the left side of the cabin 10. In this manner, when the drain portions 23 and 80 are disposed on the lateral outside from the cabin 10, the drain plugs 23b and 85 can be easily reached, and the drain portions 23 and 80 can be more easily opened.

In this embodiment, the drain portion 80 of the fuel tank 30 does not fasten the drain plug 85 to the drain port 43 directly (by forming a female screw portion), but fasten the drain plug 85 to a member (receiving member 82) different from the fuel tank body 40). According to such a configuration, even if the female screw portion of the receiving member 82 is crushed by excessively tightening the drain plug 85, only the receiving member 82 needs to be replaced instead of the fuel tank body 40. Accordingly, the labor and cost required for replacement can be reduced.

In the fuel tank 30 according to this embodiment, the positions of the drain port 43 and the suction port 44 connected to the drain portion 80 are devised to improve fuel discharging performance and suction performance.

Hereinafter, the positions of the drain port 43 and the suction port 44 of the fuel tank 30 will be described.

Figure 11:
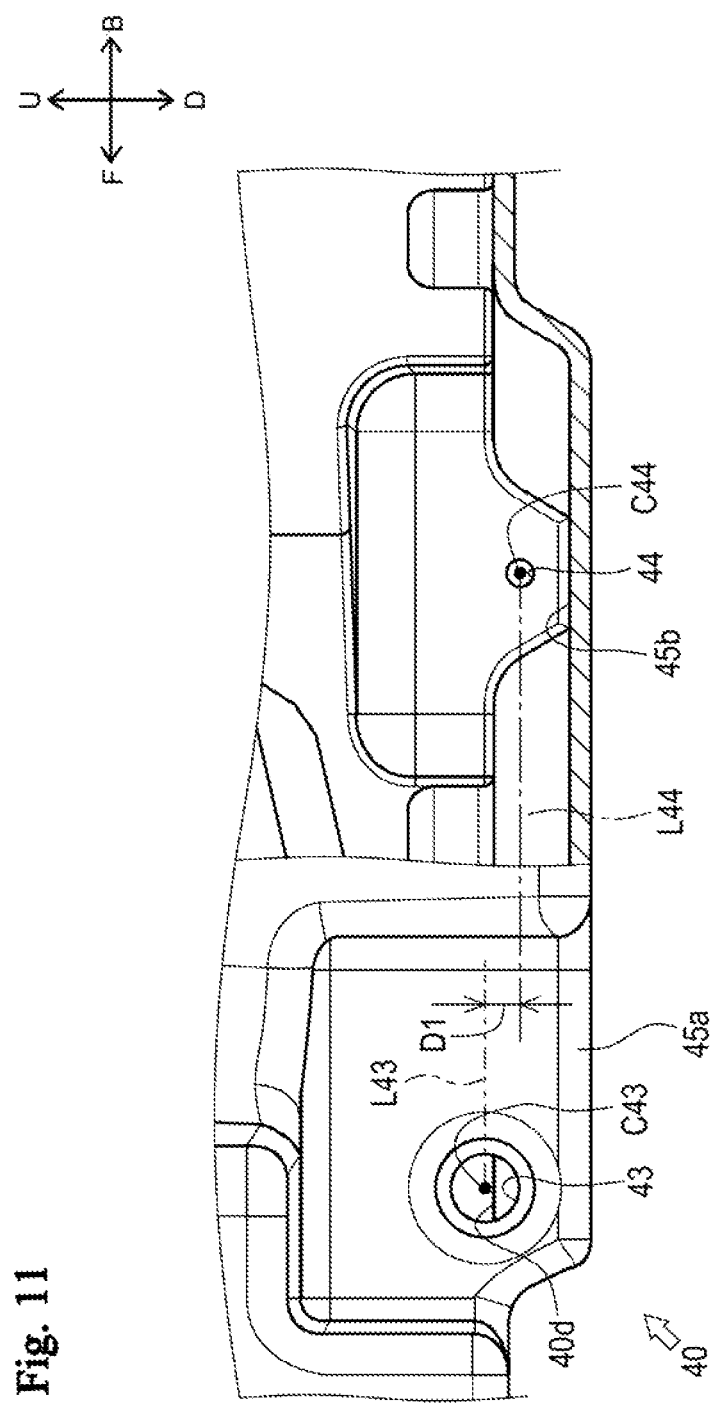
FIG. 11 is a partial side sectional view illustrating a positional relationship between the drain port and the suction port.

Centers C43 and C44 illustrated in FIG. 11 indicate the centers of the drain port 43 and the suction port 44, respectively. Further, straight lines L43 and L44 illustrated in FIG. 11 are horizontal straight lines passing through the centers C43 and C44, respectively. Further, a symbol D1 illustrated in FIG. 11 indicates the height difference between the centers C43 and C44. As is clear from FIG. 11, the center C44 of the suction port 44 is positioned at a position lower than the center C43 of the drain port 43. Herein, since the drain port 43 is for discharging fuel, the drain port 43 is disposed at a low position (the lower end portion in this embodiment) in the fuel tank body 40. In the suction port 44, the center C44 is positioned even lower than the center C43 of the drain port 43 at such a low position, and thus unless the liquid level of fuel drops considerably (until the fuel is close to empty), the liquid level does not become lower than the suction port 44. With such a configuration, the height position of the suction port 44 can be lowered, and fuel can flow into the suction port 44 even when the liquid level of the fuel is low. For this reason, fuel can be easily sucked into the engine 3.

When the fuel tank body 40 is formed by resin molding as in this embodiment, for convenience of processing, the lower ends of the outer peripheral surfaces of the drain port 43 and the suction port 44 are required to be upward (to be spaced apart) from the lower surface of the fuel tank 30. Therefore, in this embodiment, the first recess 45a and the second recess 45b are formed in the fuel tank body 40, and the lower surface of the fuel tank 30 is partially lowered. Further, in this embodiment, the drain port 43 and the suction port 44 are formed in the lowered portions (the first recess 45a and the second recess 45b). According to this, the height position of the drain port 43 and the suction port 44 can be lowered as compared with a case where the first recess 45a and the second recess 45b are not formed. Accordingly, by lowering the height position of the drain port 43 and the suction port 44, fuel can be effectively discharged (fuel hardly remains), and fuel can be more easily sucked.

As described above, the suction port 44 communicates with the second recess 45b. According to this, the fuel that has flowed into the second recess 45b positioned further lower than the bottom surface 40d can be sucked from the entire area of the suction port 44. Accordingly, fuel can be more easily sucked into the engine 3.

As described above, the drain port 43 illustrated in FIGS. 8 and 10 communicates with the first recess 45a. According to this, the fuel that has flowed into the first recess 45a positioned further lower than the bottom surface 40d can be discharged from the drain port 43. Accordingly, fuel can be effectively discharged.

As illustrated in FIG. 10, unlike the suction port 44, the drain port 43 is configured such that the entire area does not open in the first recess 45a, but the center C43 is positioned at substantially the same height as the bottom surface 40d by raising the center C43 above the suction port 44. Accordingly, the distance between the lower surface of the first recess 45a and the center C43 of the drain port 43 can be secured, so that the inner diameter of the drain port 43 can be increased. Accordingly, fuel can be easily discharged.

As illustrated in FIG. 11, the lower end of the outer peripheral surface of the drain port 43 is formed so as to be positioned at substantially the same height position as the lower end of the inner peripheral surface of the suction port 44. Accordingly, the lower end of the outer peripheral surface of the drain port 43 can be reduced as much as possible, and thus the outer diameter of the drain port 43 can be further increased. Along with this, the inner diameter of the drain port 43 can be increased, so that fuel can be more easily discharged.

As described above, the upper surface of the second recess 45b illustrated in FIG. 8 communicates with the upper surface of the first recess 45a so as to be flush. Accordingly, the fuel accumulated in the second recess 45b can be discharged from the drain port 43 through the first recess 45a. Further, the fuel accumulated in the first recess 45a can be sucked from the suction port 44 through the second recess 45b. Accordingly, fuel can be effectively discharged from the drain port 43, and fuel can be effectively sucked from the suction port 44.

Here, impurities may remain around the drain port 43 when fuel is discharged. Since the drain port 43 and the suction port 44 according to this embodiment are formed on opposite side surfaces (a left side surface and a right side surface), the distance between the drain port 43 and the suction port 44 can be secured. For this reason, it is possible to suppress impurities remaining around the drain port 43 from being sucked when the fuel is sucked. Thus, it is possible to suppress impurities from being sucked when fuel is sucked.

As illustrated in FIGS. 2 and 6, the drain port 43 is disposed in front of the step 13. As described above, by shifting the drain port 43 back and forth with respect to the step 13, the drain portion 80 can be easily attached to and detached from the drain port 43. Thereby, maintainability can be improved.

The suction port 44 is disposed behind the engine 3. Accordingly, the engine 3 and the suction port 44 can be easily connected by the hose disposed to extend substantially in the front-rear direction. Accordingly, the hose can be disposed easily.

The tractor 1 according to this embodiment includes the fixing structure 100 as a structure for fixing the fuel tank 30 configured as described above. Hereinafter, the fixing structure 100 will be described with reference to FIGS. 6, 9, 12 to 17.

The fixing structure 100 includes a first fixing portion 110 and a second fixing portion 120. The first fixing portion 110 is for fixing the fuel tank 30 horizontally (laterally) in the first fixed portion 50 of the fuel tank 30 illustrated in FIGS. 6 and 12. First, the configuration of the first fixed portion 50 will be described.

Figure 13:
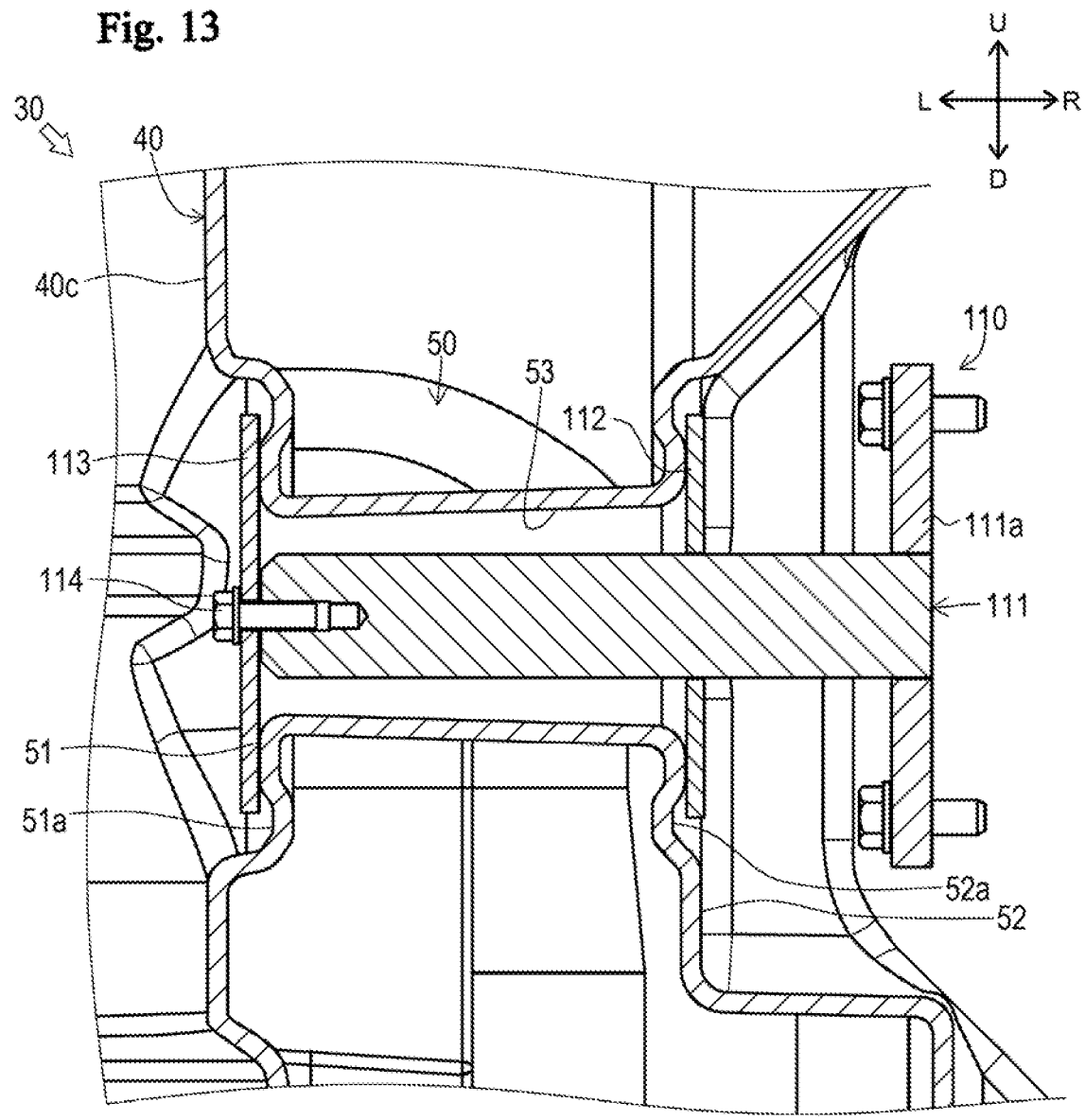
FIG. 13 is a cross-sectional view taken along line A1-A1.

The first fixed portions 50 are formed at two places with an interval in the front and rear direction. The front first fixed portion 50 is formed above the drain port 43. The rear first fixed portion 50 is formed behind the step 13 (see FIG. 2). Incidentally, hereinafter, the rear first fixed portion 50 will be described, and the description of the front first fixed portion 50 will be omitted. As illustrated in FIGS. 6 and 13, the first fixed portion 50 includes a left housing portion 51, a right housing portion 52, and an insertion portion 53.

The left housing portion 51 is a portion for housing a washer 113 of the first fixing portion 110 described later. The left housing portion 51 is formed in a substantially circular shape in side view. The left housing portion 51 is formed by recessing the left side surface (third left side surface 40c) of the fuel tank 30. The left housing portion 51 includes an annular recess 51a.

The annular recess 51a is a portion that is partially concave rightward in the left housing portion 51. The annular recess 51a is formed in a substantially annular shape in side view by recessing the outer peripheral side of the left housing portion 51.

The right housing portion 52 is a part for housing a disk member 112 of the first fixing portion 110 described later. The right housing portion 52 is formed by recessing the right side surface of the fuel tank 30. The right housing portion 52 is formed on right side (back side) of the left housing portion 51. The right housing portion 52 includes an annular recess 52a.

The annular recess 52a is a portion that is partially recessed leftward in the right housing portion 52. The annular recess 52a is formed in a substantially annular shape in side view.

The insertion portion 53 is a hole into which a shaft member 111 of the first fixing portion 110 described later is inserted. The insertion portion 53 is formed in a substantially circular shape in side view. The insertion portion 53 is formed to extend in the right-left direction and is formed such that the diameter increases toward the right side. The insertion portion 53 is formed to extend from the left housing portion 51 to the right housing portion 52.

Figure 12:
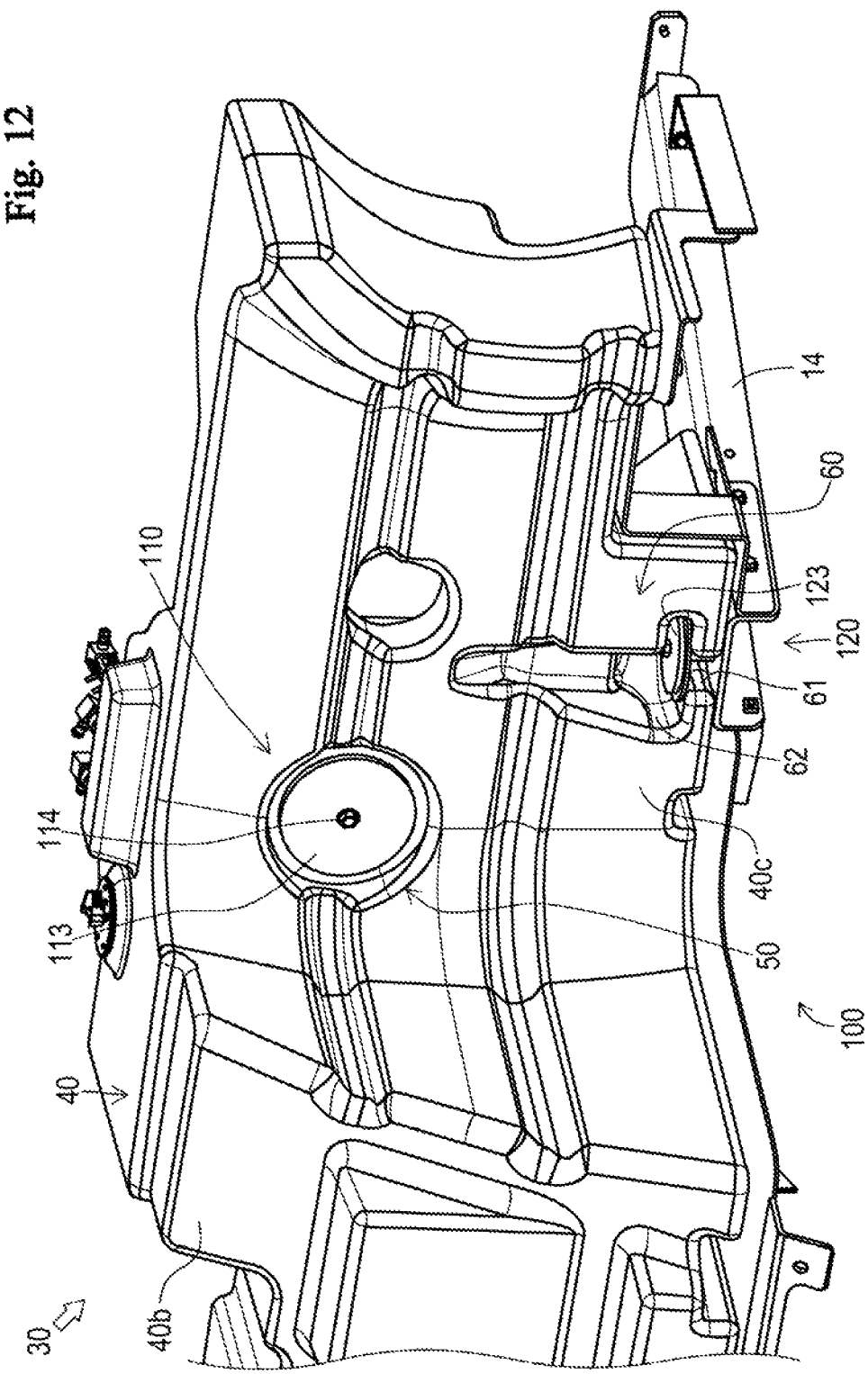
FIG. 12 is a rear perspective view illustrating a fixing structure.

Next, the configuration of the first fixing portion 110 will be described. The first fixing portion 110 fixes the front and rear first fixed portions 50 to a clutch housing (not illustrated). Hereinafter, the rear first fixing portion 110 will be described, and the description of the front first fixing portion 110 will be omitted. As illustrated in FIGS. 12 and 13, the first fixing portion 110 includes the shaft member 111, the disk member 112, the washer 113, and a bolt 114.

The shaft member 111 is disposed with the axial direction facing the right-left direction. The shaft member 111 is inserted into the insertion portion 53, and the right portion protrudes rightward from the right housing portion 52. The right end portion of the shaft member 111 is fixed to the clutch housing through a bracket 111a. A female screw portion is formed in the central portion of the left end surface of the shaft member 111 (not illustrated).

The disk member 112 is a member that is externally fitted to the shaft member 111. The outer diameter of the disk member 112 is formed to be larger than the inner diameter of the annular recess 52a of the right housing portion 52. The disk member 112 is disposed in the right housing portion 52 and is in contact with the right side surface of the right housing portion 52.

The washer 113 is for sandwiching the fuel tank 30 between the disk member 112 and the washer 113. The outer diameter of the washer 113 is formed to be larger than the inner diameter of the annular recess 51a of the left housing portion 51. The disk member 112 is disposed in the left housing portion 51 and is in contact with the left side surface of the left housing portion 51.

The bolt 114 is fastened to the female screw portion of the shaft member 111 from the right side. Accordingly, the bolt 114 fastens the washer 113, and fixes the washer 113 to the shaft member 111.

The first fixing portion 110 configured as described above elastically deforms the left housing portion 51 and the right housing portion 52 by the disk member 112 and the washer 113, so that the disk member 112 and the washer 113 can be in close contact with the fuel tank 30. Accordingly, the first fixing portion 110 can fix the fuel tank 30 to the clutch housing in the first fixed portion 50.

In the first fixing portion 110, the outer diameters of the disk member 112 and the washer 113 are formed to be larger than the inner diameters of the annular recesses 51a and 52a, and the outer peripheral edges of the disk member 112 and the washer 113 do not come into contact with the left housing portion 51 and the right housing portion 52. Accordingly, the fuel tank body 40 is prevented from being damaged by the outer peripheral edges (corner portions) of the disk member 112 and the washer 113.

The second fixing portion 120 is for fixing the fuel tank 30 vertically (up and down) in the second fixed portion 60 of the fuel tank 30 illustrated in FIGS. 6 and 12. First, the configuration of the second fixed portion 60 will be described.

The second fixed portion 60 is formed on the lower rear side of the rear first fixed portion 50. The second fixed portion 60 includes a notch 61 and a recess 62.

Figure 14:
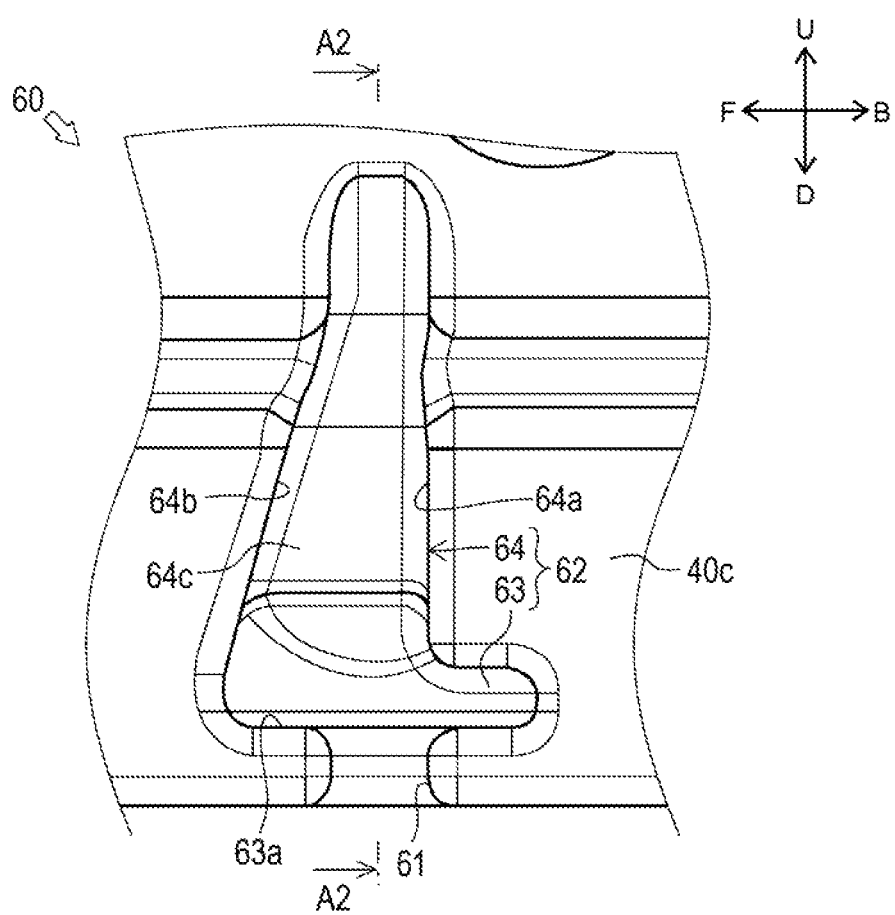
FIG. 14 is a side view illustrating a second fixed portion.
Figure 15:
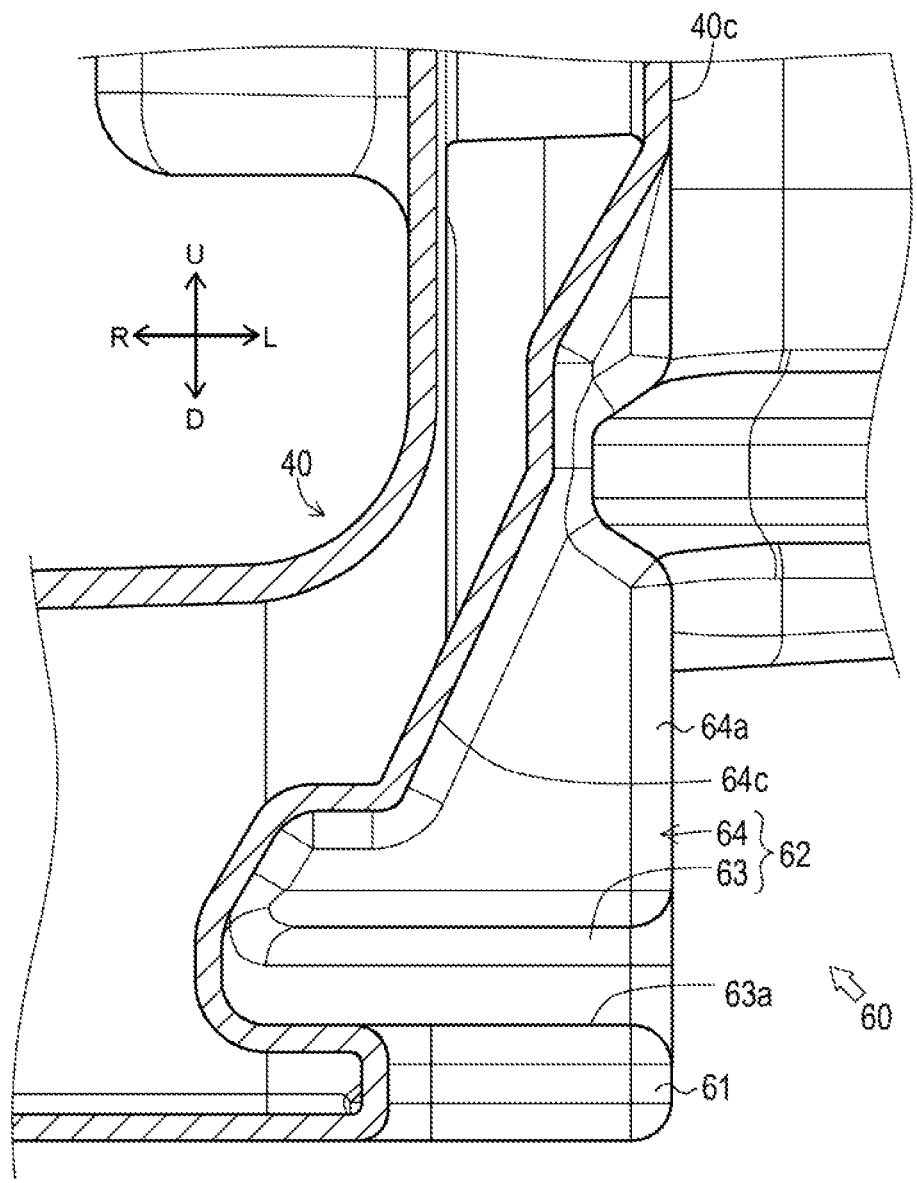
FIG. 15 is a cross-sectional view taken along line A2-A2.

The notch 61 illustrated in FIGS. 9, 14, and 15 is a portion for housing a tubular member 121 of the second fixing portion 120 described later. The notch 61 extends from the left end portion to the right side with a certain width (a width in the front-rear direction) and is formed in a substantially U-shape in bottom view to which the extended end portion (right end portion) is connected. The left end portion of the notch 61 is formed to be open on the third left side surface 40c. The right end portion of the notch 61 is formed in a substantially semicircular shape in bottom view. The notch 61 is formed to extend over the lower surface of the fuel tank body 40 and a contact surface 63a of the recess 62 described later. The notch 61 is disposed on the right side of the rear wheel 7 (see FIG. 1).

The recess 62 illustrated in FIGS. 14 and 15 is a portion for housing a rubber washer 122 and a washer 123 of the second fixing portion 120 described later. The recess 62 is formed above the notch 61. The recess 62 is formed in a substantially L-shape in side view so as to extend rearward and upward from the lower front portion. The recess 62 is formed by recessing the third left side surface 40c to the right side. The recess 62 includes a housing portion 63 and an extending portion 64.

The housing portion 63 is the lower portion of the recess 62. The housing portion 63 is formed in a substantially U-shape in bottom view such that the notch 61 is enlarged (see FIG. 9). The housing portion 63 is formed such that the width in the front-rear direction and the width in the right-left direction are larger than the width in the front-rear direction and the width in the right-left direction of the notch 61. The lower surface of the housing portion 63 is formed as the contact surface 63a that abuts on the rubber washer 122.

The extending portion 64 is a portion that extends upward from the housing portion 63. The extending portion 64 is formed in a tapered shape such that the width in the front-rear direction becomes narrower upward. The extending portion 64 is formed above the notch 61. The extending portion 64 includes a vertical portion 64a, an inclined portion 64b, and an inclined surface 64c.

The vertical portion 64a is a rear side surface (a surface facing forward) of the extending portion 64 and a portion extending in parallel with the vertical direction (vertical direction). The vertical portion 64a is formed to extend substantially upward from the rear portion of the housing portion 63. The front-rear position of the vertical portion 64a is formed to be substantially the same as the front-rear position of the rear side surface (a surface facing forward) of the notch 61. The inclined portion 64b is a front side surface (a surface facing rearward and downward) of the extending portion 64 and a portion inclined with respect to the vertical direction. The inclined portion 64b is formed to extend rearward and upward from the front end of the housing portion 63. The upper ends of the vertical portion 64a and the inclined portion 64b are connected to each other. In this way, the extending portion 64 is formed in a substantially right-angled triangular shape (a shape that is asymmetrical in the front-rear direction) in side view such that the front side approaches the vertical portion 64a (rear side). Accordingly, the upper side of the rear end portion of the housing portion 63 is prevented from being recessed.

The inclined surface 64c is a bottom surface (a surface facing leftward) of the extending portion 64. The inclined surface 64c is formed so as to extend from the lower right end portion to the upper left side (lateral outside).

Figure 16:
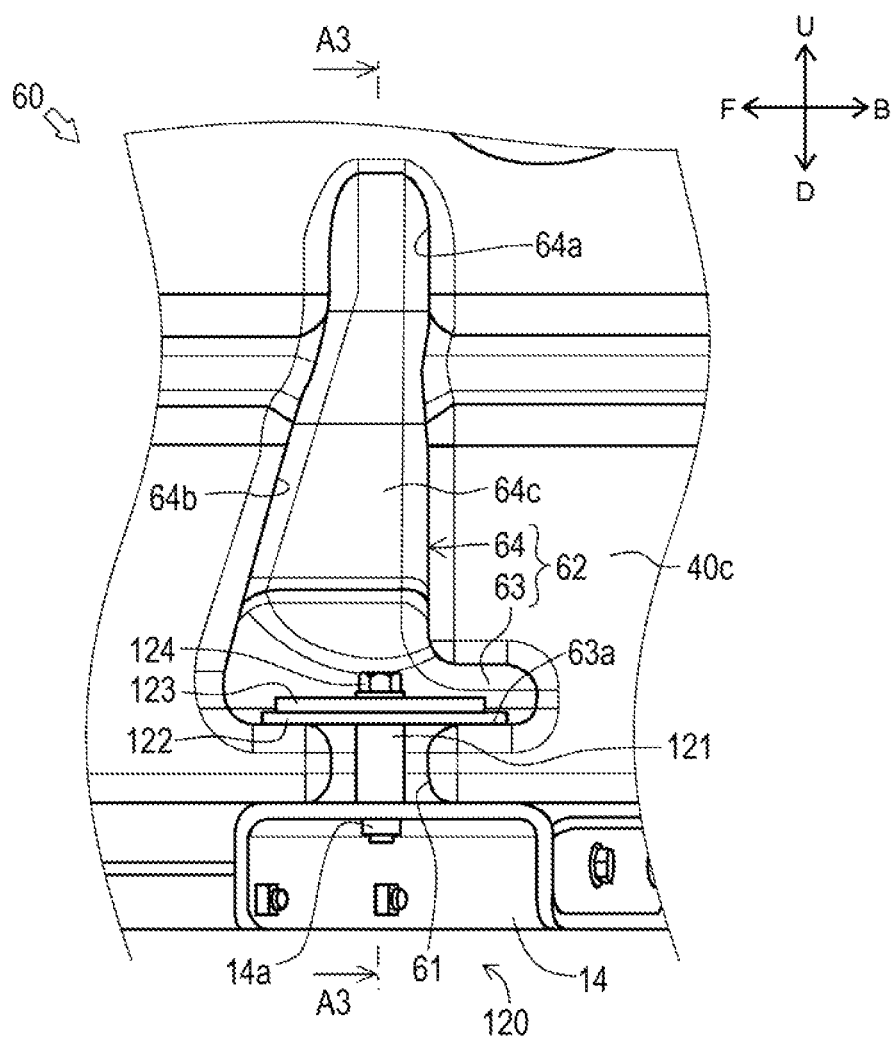
FIG. 16 is a side view illustrating the second fixed portion and a second fixing portion.
Figure 17:
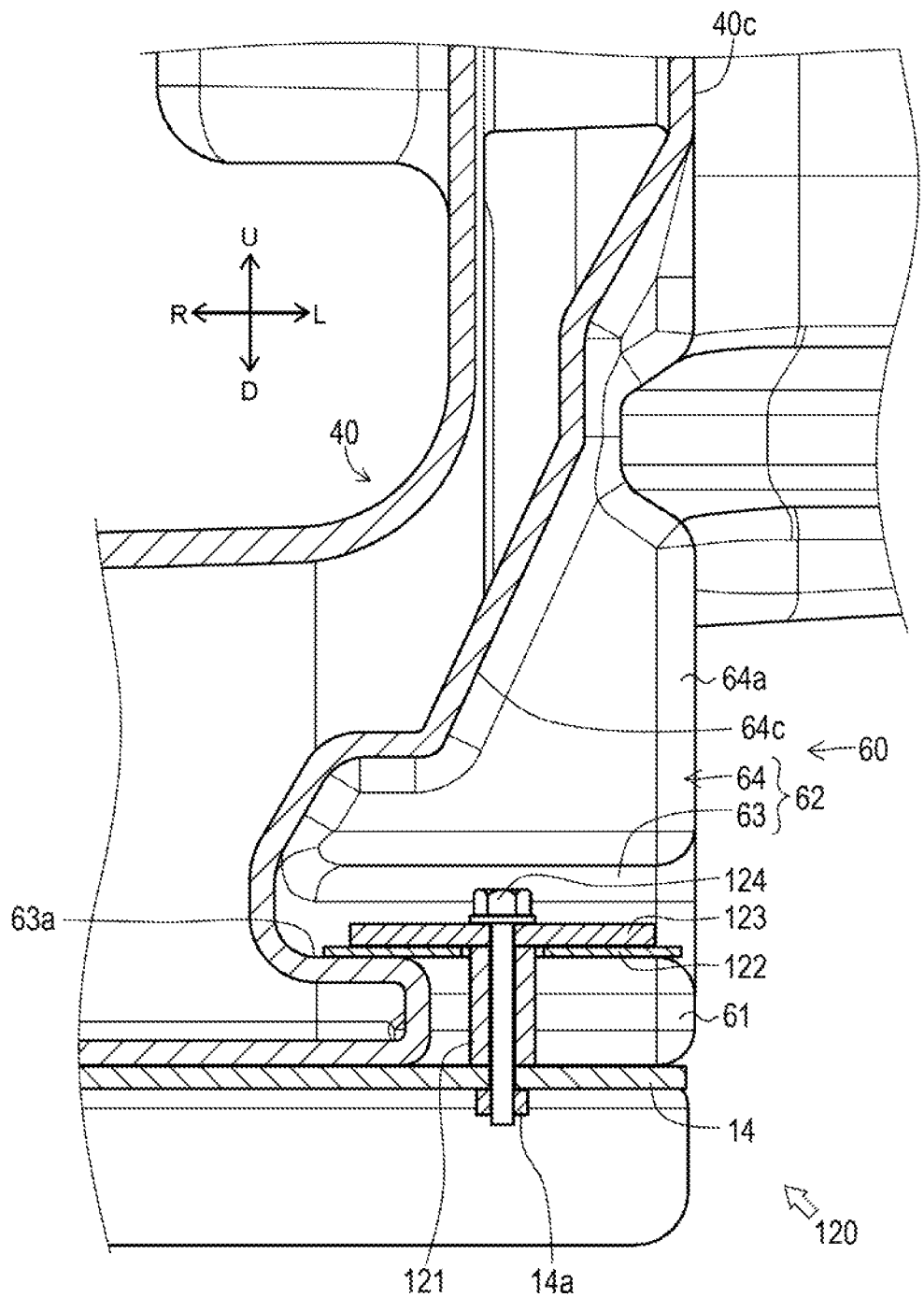
FIG. 17 is a cross-sectional view taken along line A3-A3.

Next, the configuration of the second fixing portion 120 will be described. As illustrated in FIGS. 16 and 17, the second fixing portion 120 is for fixing the second fixed portion 60 of the fuel tank 30 to the mounting frame 14. The second fixing portion 120 includes the tubular member 121, the rubber washer 122, the washer 123, and a bolt 124.

The tubular member 121 is disposed with the axial direction directed in the vertical direction. The outer diameter of the tubular member 121 is formed to be smaller than the width of the notch 61 in the front-rear direction. The inner diameter of the tubular member 121 is formed to be larger than the shaft portion of the bolt 124 described later. The tubular member 121 is placed on the mounting frame 14 and disposed in the notch 61.

The rubber washer 122 is provided above the tubular member 121. The outer diameter of the rubber washer 122 is formed so as to be larger than the width of the notch 61 in the front-rear direction and smaller than the width in the front-rear direction and the width in the right-left direction of the housing portion 63. The rubber washer 122 is externally fitted to the upper end portion of the tubular member 121 and is disposed in the housing portion 63. The lower surface of the rubber washer 122 abuts on the contact surface 63a of the housing portion 63.

The washer 123 is provided above the rubber washer 122. The outer diameter of the washer 123 is formed to be larger than the width of the notch 61 in the front-rear direction and smaller than the outer diameter of the rubber washer 122. The washer 123 is placed on the rubber washer 122 and is disposed in the housing portion 63.

The bolt 124 is disposed below the extending portion 64 and is provided to penetrate the notch 61 vertically. The bolt 124 is inserted into the tubular member 121, the rubber washer 122, and the washer 123. The lower end of the bolt 124 is fastened to a nut 14a fixed to the mounting frame 14. Accordingly, the bolt 124 fixes the washer 123.

When the contact surface 63a and the lower surface of the fuel tank body 40 are sandwiched by the rubber washer 122 and the washer 123, and the mounting frame 14, the second fixing portion 120 configured as above elastically deforms the rubber washer 122 and the fuel tank body 40. Thereby, the rubber washer 122 and the mounting frame 14 can be brought into close contact with the fuel tank 30. Accordingly, the second fixing portion 120 can fix the fuel tank 30 to the mounting frame 14 in the second fixed portion 60.

Such a second fixing portion 120 fixes the fuel tank 30 in the following procedure.

First, the operator places the fuel tank 30 on the mounting frame 14. Then, the tubular member 121 is set in the notch 61 of the mounting frame 14.

Next, the operator inserts the rubber washer 122 and the washer 123 into the bolt 124, and inserts the bolt 124 into the tubular member 121. Then, the bolt 124 is fastened to the nut 14*a* using a tool. Thus, the fuel tank 30 can be fixed by the second fixing portion 120.

According to the fixing structure 100 according to this embodiment, the second fixed portion 60 visible from the left side surface of the fuel tank 30 is fixed, so that the fuel tank 30 can be easily fixed. Specifically, as a general fixing method of the fuel tank 30, there is a method of winding a metal belt around the fuel tank 30 and fixing the metal belt to the mounting frame 14. In the fixing method, the metal belt is wound from above the fuel tank 30, and both ends (lower ends) are fixed to the mounting frame 14. In this case, in the both ends of the metal belt, the end on the back side (lateral inside) is difficult to fix. On the other hand, in the fixing structure 100 according to this embodiment, it is not necessary to perform the fixing operation on the inner side of the fuel tank 30, so that the fuel tank 30 can be easily fixed.

In the fuel tank 30, the notch 61 in which the tubular member 121 is set is open on the third left side surface 40*c*. Therefore, the operator can set the tubular member 121 not only from above but also from the left side (the opening portion of the notch 61). According to such a configuration, the tubular member 121 can be easily set, and the fuel tank 30 can be easily fixed.

When the fuel tank body 40 is formed by resin molding as in this embodiment, the notch 61 can be formed without complicating the shape of the mold. Therefore, the manufacturing cost of the fuel tank body 40 can be reduced.

Here, when the notch 61 is formed, the capacity of the fuel tank 30 is reduced, and the area of the lower surface of the fuel tank body 40 and the contact surface 63*a* of the recess 62 (the contact area with the mounting frame 14 and the rubber washer 122) is reduced. In this regard, in this embodiment, the notch 61 is formed in a substantially U-shape in bottom view with a width that allows the tubular member 121 to be inserted. According to this, it is possible to prevent the shape of the notch 61 in bottom view from becoming larger than necessary. Therefore, it is possible to suppress a decrease in the capacity of the fuel tank 30 and a decrease in the contact area with the mounting frame 14 and the rubber washer 122.

In fixing the fuel tank 30, the rubber washer 122 and the washer 123 are inserted into the recess 62 (housing portion 63), and the rubber washer 122 and the washer 123 can be suppressed from interfering with members other than the fuel tank 30. Accordingly, the fuel tank 30 can be fixed more easily.

The vertical width of the notch 61 can be reduced by forming the recess 62 (housing portion 63). Specifically, when the recess 62 is not formed unlike this embodiment, it is necessary to sandwich the fuel tank body 40 at the upper surface and the lower surface. In this embodiment, the fuel tank body 40 can be sandwiched at the lower surface and the vicinity of the lower end of the fuel tank body 40 by the recess 62. Accordingly, as compared with a case where the fuel tank is sandwiched at the upper surface and the lower surface of the fuel tank body 40, the vertical width of the notch 61 can be reduced, and a decrease in the capacity of the fuel tank 30 can be suppressed.

In this embodiment, since the extending portion 64 is formed above the bolt 124, the bolt 124 can be fastened by inserting a tool into the extending portion 64. Accordingly, the bolt 124 can be easily fastened, and thus the fuel tank 30 can be easily fixed.

Herein, when the extending portion 64 is formed, the fuel tank 30 is recessed by that amount, and the capacity of the fuel tank 30 is reduced. In this regard, in this embodiment, an inclined surface 64*c* extending to the upper left side is formed. According to this, the amount of recess can be reduced toward the upper side. Thus, a decrease in the capacity of the fuel tank 30 can be suppressed as much as possible.

The notch 61 is open on the third left side surface 40*c* positioned on the laterally innermost side of the left side surface (the first left side surface 40*a*, the second left side surface 40*b*, and the third left side surface 40*c*) of the fuel tank 30. Accordingly, the notch 61 can be disposed on the lateral inside of the fuel tank 30 as much as possible, so that stones or the like can be suppressed from entering the recess 62. Accordingly, it is possible to suppress the bolt 124 from coming off from the nut 14*a* by being hit by stones or the like.

Herein, the width of the extending portion 64 in the front-rear direction is preferably small from the viewpoint of securing the capacity of the fuel tank 30. On the other hand, in this embodiment, the bolt 124 is fastened using the space in the extending portion 64, and thus from the viewpoint of workability, the extending portion 64 preferably has a larger width in the front-rear direction. Further, since an axle 7*a* of the rear wheel 7 or the like are provided behind the extending portion 64 (see FIG. 1), the extending portion 64 is desirably formed on the side (front side) far from the axle 7*a* in terms of workability.

In view of the above circumstances, the extending portion 64 according to this embodiment is formed in a substantially right-angled triangular shape in side view including the slope (inclined portion 64*b*) extending to the upper rear side from the front end (a portion farthest from the axle 7*a* or the like) of the housing portion 63 and the vertical line (vertical portion 64*a*) extending to the upper side in front of the rear end portion (a portion closest to the axle 7*a* and the like) of the housing portion 63. Accordingly, while the width of the extending portion 64 in the front-rear direction is gradually reduced to suppress the decrease in the capacity of the fuel tank 30, the space for the extending portion 64 is secured to facilitate fastening of the bolt 124 in the extending portion 64. Further, workability is effectively improved by separating the extending portion 64 from the axle 7*a* or the like.

Further, as described above, the fuel tank 30 is placed on the mounting frame 14 at the time of fixing. Since the fuel tank 30 is relatively heavy, the operator moves the fuel tank 30 to a predetermined position by sliding the fuel tank 30 rightward with respect to the upper surface of the mounting frame 14 at the time of placing. At this time, the lower surface of the connection recess 45 (the first recess 45*a* and the second recess 45*b*) of the fuel tank 30 slides with respect to the mounting frame 14. The connection recess 45 according to this embodiment is formed from the left end portion to the right end portion of the fuel tank 30, and the lower surfaces of the first recess 45*a* and the second recess 45*b* are flush with each other. Thus, at the time of sliding, the connection recess 45 is neither caught by the mounting frame 14 nor dropped from the mounting frame 14 on the way. Accordingly, the fuel tank 30 can be placed smoothly.

In the second fixing portion 120, the rubber washer 122 is disposed between the washer 123 and the contact surface 63*a* of the housing portion 63 so that the washer 123 does not directly contact the contact surface 63*a*. Further, the outer diameter of the rubber washer 122 is configured to be larger than the outer diameter of the washer 123. According to such a configuration, even if the contact surface 63*a* is not partially recessed (even if the recesses such as the annular recesses 51*a* and 52*a* are not formed), it is possible to prevent the outer peripheral edge of the washer 123 from being brought into contact with the contact surface 63*a*. Accordingly, the fuel tank body 40 is prevented from being damaged by the outer peripheral edges (corner portions) of the washer 123.

As described above, the fuel tank 30 of the tractor 1 (work vehicle) according to this embodiment includes: the drain port 43 which is open to an outside on a side surface and through which fuel is discharged to the outside; and the suction port 44 which is open to the outside on the side surface and has the center C44 positioned lower than the center C43 of the drain port 43 and through which the fuel is sucked by the engine 3.

With such a configuration, the height position of the suction port 44 can be lowered to facilitate the suction of fuel into the engine 3.

The fuel tank 30 further includes: the first recess 45*a* which is formed to be recessed downward with respect to the bottom surface 40*d* and communicates with the drain port 43.

With this configuration, fuel hardly remains on the bottom surface 40*d*, so that fuel can be discharged effectively.

The center C43 of the drain port 43 is positioned at substantially the same height as the bottom surface 40*d*.

With this configuration, the distance between the lower surface of the first recess 45*a* and the center C43 of the drain port 43 can be secured so that the diameter of the drain port 43 can be increased. Thus, fuel can be easily discharged.

The fuel tank 30 further includes: the second recess 45*b* which is formed to be recessed downward with respect to the bottom surface 40*d* and communicates with the suction port 44.

With this configuration, fuel can be more easily sucked into the engine 3.

The center C44 of the suction port 44 is positioned at a position lower than the bottom surface 40*d*.

With such a configuration, the height position of the suction port 44 can be lowered, and fuel can be more easily sucked into the engine 3.

The first recess 45*a* and the second recess 45*b* communicate with each other so as not to generate a step on the lower surfaces.

With this configuration, fuel can be effectively discharged from the drain port 43, and fuel can be effectively suctioned from the suction port 44.

The lower surface of the first recess 45*a* and the lower surface of the second recess 45*b* are formed to be parallel to a horizontal direction (a front-rear direction and a right-left direction).

With such a configuration, even if the liquid level of fuel becomes low, the fuel is not biased to any one of the first recess 45*a* and the second recess 45*b*. Thus, the fuel can be effectively discharged from the drain port 43, and fuel can be effectively sucked from the suction port 44.

The drain port 43 and the suction port 44 are formed on opposite side surfaces.

With this configuration, it is possible to suppress impurities remaining around the drain port 43 from being sucked when fuel is sucked.

The tractor 1 according to this embodiment includes the fuel tank 30.

With such a configuration, the height position of the suction port 44 can be lowered to facilitate the suction of fuel into the engine 3.

Incidentally, the tractor 1 according to this embodiment is an embodiment of a work vehicle.

The outline of the disclosure is listed below based on the above embodiments.

The technique of a work vehicle equipped with a fuel tank and a urea water tank is known. For example, the technique is as described in JP 2017-81259 A.

The tractor (work vehicle) described in JP 2017-81259 A includes a left fuel tank and a right fuel tank (fuel tank) disposed on left and right sides of a body and a urea water tank disposed in front of the right fuel tank. Such a tractor includes a drain portion capable of discharging fuel in the fuel tank and urea water in the urea water tank. The drain portion is generally provided on the lower surfaces of the fuel tank and the urea water tank in order to easily discharge the fuel and the urea water.

In this configuration, the operator needs to open the drain portion by reaching under the fuel tank and the urea water tank, which is hard to work. As described above, in the related art, it is difficult to easily perform the operation of discharging fuel and urea water.

The disclosure has been made in view of the above situation, and a problem to be solved is to provide a work vehicle that can easily perform an operation of discharging fuel and urea water.

The tractor 1 (work vehicle) according to the embodiment of the disclosure includes the fuel tank 30 including the drain portion 80 (fuel drain portion) that can discharge fuel to the outside and is disposed on a surface (second left side surface 40*b*) facing one side (left side) and the urea water tank 20 having the drain portion 23 (urea water drain portion) which can discharge urea water to the outside and is disposed on the one side (left side) of the fuel tank 30.

With this configuration, the operation of discharging fuel and urea water can be easily performed.

Further, the drain portions 23 and 80 are disposed in front of the step 13 disposed on the one side of the fuel tank 30.

With this configuration, the operation of discharging fuel and urea water can be performed more easily by reducing the distance between the drain portions 23 and 80.

The drain portions 23 and 80 are disposed such that the height positions are different from each other.

With this configuration, the drain portions 23 and 80 can be distinguished by the difference in the height position, and thus it is possible to prevent fuel and urea water from being erroneously discharged.

The drain portion 23 of the urea water tank 20 is disposed above the drain portion 80 of the fuel tank 30.

With this configuration, it is possible to prevent fuel and urea water from being erroneously discharged.

The drain portions 23 and 80 are disposed such that the positions in the right-left direction are different from each other.

With this configuration, the drain portions 23 and 80 can be distinguished by the difference in the position in the right-left direction, and thus it is possible to prevent fuel and urea water from being erroneously discharged.

The drain portion 23 of the urea water tank 20 is disposed on the lateral outside of the drain portion 80 of the fuel tank 30.

With this configuration, it is possible to prevent fuel and urea water from being erroneously discharged.

The drain portions 23 and 80 are disposed such that the positions in the front-rear direction are different from each other.

With this configuration, the drain portions 23 and 80 can be distinguished by the difference in the position in the front-rear direction, and thus it is possible to prevent fuel and urea water from being erroneously discharged.

The drain portion 23 of the urea water tank 20 is disposed in front of the drain portion 80 of the fuel tank 30.

With this configuration, it is possible to prevent fuel and urea water from being erroneously discharged.

The drain portion 23 of the urea water tank 20 is provided such that other members do not intervene below.

With such a configuration, the urea water discharged from the drain portion 23 of the urea water tank 20 can be suppressed from being splashed on other members.

The drain portion 80 of the fuel tank 30 is disposed below the urea water tank 20 and is disposed so as not to overlap with the drain portion 23 of the urea water tank 20 in bottom view.

With such a configuration, the space below the urea water tank 20 can be utilized to provide the drain portion 80 of the fuel tank 30. Thus, it is possible to effectively use the space.

The drain portion 80 of the fuel tank 30 is disposed on a surface (second left side surface 40b) facing the lateral outside.

With this configuration, the drain portion 80 of the fuel tank 30 can be opened from the lateral outside, and thus the operation of discharging fuel can be performed more easily.

The drain portions 23 and 80 are disposed on the lateral outside of the cabin 10.

With this configuration, the operation of discharging fuel and urea water can be performed more easily.

Incidentally, the tractor 1 according to this embodiment is an embodiment of a work vehicle.

The drain portion 80 according to this embodiment is an embodiment of the fuel drain portion.

The drain portion 23 according to this embodiment is an embodiment of the urea water drain portion.

Further, as described above, the fixing structure 100 of the fuel tank 30 according to this embodiment includes the rubber washer 122 and the washer 123 (fixing member) which sandwich the fuel tank 30 together with the mounting frame 14 (frame) and the shaft member 111 interposed between the mounting frame 14, and the rubber washer 122 and the washer 123. The fuel tank 30 includes the lower surface (first contact surface) of the fuel tank 30 that contacts the mounting frame 14, the contact surface 63a (second contact surface) that contacts the rubber washer 122 and the washer 123, the third left side surface 40c (connection surface) that connects the lower surface of the fuel tank 30 and the contact surface 63a, and the notch 61 that is open to the third left side surface 40c and is formed to extend from the lower surface of the fuel tank 30 to the contact surface 63a and in which the shaft member 111 is housed.

With this configuration, the shaft member 111 can be easily interposed between the mounting frame 14, and the rubber washer 122 and the washer 123, and thus the fuel tank 30 can be easily fixed.

The notch 61 is formed to extend with a certain width from the opening to the bottom portion when viewed in the longitudinal direction of the shaft member 111.

With this configuration, it is possible to suppress a decrease in the capacity of the fuel tank 30 and a decrease in the contact area of the fuel tank 30 with the mounting frame 14 and the shaft member 111.

The fuel tank 30 further includes the recess 62 capable of housing the rubber washer 122 and the washer 123.

With this configuration, the fuel tank 30 can be fixed more easily.

The recess 62 includes the housing portion 63 housing the rubber washer 122 and the washer 123 and the extending portion 64 which is formed from the housing portion 63 to extend in a direction (upward) of being separated from the rubber washer 122 and the washer 123.

With this configuration, a space can be formed by the extending portion 64 on the side (upper side) of the housing portion 63 that is separated from the rubber washer 122 and the washer 123. According to this, when the rubber washer 122 and the washer 123 are provided, the fuel tank 30 is hardly obstructed, and thus the fuel tank 30 can be fixed more easily.

The extending portion 64 is formed with the inclined surface 64c that swells outward in a direction (upward) of being separated from the rubber washer 122 and the washer 123.

With this configuration, a decrease in the capacity of the fuel tank 30 can be suppressed as much as possible.

The rubber washer 122 and the washer 123 are fixed by the bolt 124 (fastener) fastened in the recess 62.

With this configuration, the bolt 124 can be fastened utilizing the space of the extending portion 64. Accordingly, the fuel tank 30 can be fixed more easily.

The notch 61 is positioned on the lateral inside of the rear wheel 7 (wheel).

With such a configuration, the notch 61 can be made hard to seen from the outside. Accordingly, appearance can be improved.

The fuel tank 30 is placed on the mounting frame 14.

With this configuration, the shaft member 111, the rubber washer 122, and the washer 123 can be mounted while the fuel tank 30 is placed on the mounting frame 14, and thus the fuel tank 30 can be fixed more easily.

The third left side surface 40c is formed to face one side in the right-left direction, and the fuel tank 30 further includes the first left side surface 40a and the second left side surface 40b (non-connection surface) which face the one side in the right-left direction and are positioned on the lateral outside of the third left side surface 40c.

With this configuration, it is possible to suppress stones or the like from entering the notch 61, and thus it is possible to prevent the rubber washer 122 and the washer 123 from coming off.

The tractor 1 (work vehicle) according to this embodiment includes the fixing structure 100 for the fuel tank 30.

With this configuration, the shaft member 111 can be easily inserted, and thus the fuel tank 30 can be easily fixed.

Incidentally, the mounting frame 14 according to this embodiment is an embodiment of the frame.

Further, the rubber washer 122 and the washer 123 according to this embodiment are one embodiment of the fixing member.

Further, the lower surface of the fuel tank 30 according to this embodiment is one embodiment of the first contact surface.

Further, the contact surface 63a according to this embodiment is one embodiment of the second contact surface.

Further, the third left side surface 40c according to this embodiment is one embodiment of the connection surface.

Further, the bolt 124 according to this embodiment is one embodiment of the fastener.

Further, the rear wheel 7 according to this embodiment is one embodiment of the wheel.

Further, the first left side surface 40a and the second left side surface 40b according to this embodiment are one embodiment of the non-connection surface.

Further, the tractor 1 according to this embodiment is one embodiment of the work vehicle.

As described above, the embodiments of the disclosure have been described. However, the disclosure is not limited to the above configuration, and various changes can be made within the scope of the invention described in the claims.

For example, the work vehicle according to this embodiment is the tractor 1, but the type of the work vehicle according to the disclosure is not limited to this. The work vehicle according to the disclosure may be another agricultural vehicle, a construction vehicle, an industrial vehicle, or the like.

The drain port 43 and the suction port 44 are formed in a substantially cylindrical shape. However, the disclosure is not limited to this, and may have any shape. In this configuration, the inner peripheral surface and the outer peripheral surface of the drain port 43 and the suction port 44 are not circular, but the drain port 43 and the center C44 of the suction port 44 in this case are appropriately determined according to the shapes of the drain port 43 and the suction port 44. For example, when the cross-sectional shape of the drain port 43 is substantially triangular, the center C43 of the drain port 43 may be the center (the intersection of the bisectors of three apex angles) of the triangle. Further, the center C43 of the drain port 43 may be the central portion of the cross-sectional shape in the height direction and the width direction.

The drain port 43 is formed such that the lower end portion (part) of the inner peripheral surface is in the first recess 45*a*, but the disclosure is not limited to this. The entire inner peripheral surface may be in the first recess 45*a*. Accordingly, the drain port 43 can lower the height position of the center C43 and effectively discharge fuel in the first recess 45*a*.

The suction port 44 has an inner peripheral surface formed in the second recess 45*b*, but the disclosure is not limited to this. At least a part of the inner peripheral surface may be in the second recess 45*b*. Accordingly, the suction port 44 can communicate with the second recess 45*b* to suck the fuel in the second recess 45*b*.

The first recess 45*a* and the second recess 45*b* communicate with each other. However, the disclosure is not limited thereto. The first recess 45*a* and the second recess 45*b* may not communicate with each other (be formed to be separated to right and left sides).

The fuel tank 30 is not necessarily provided with the first recess 45*a* and the second recess 45*b*.

The positional relationship between the centers C43 and C44 of the drain port 43 and the suction port 44 and the bottom surface 40*d* is not limited to this embodiment, and may be an arbitrary positional relationship.

The drain port 43 and the suction port 44 are formed on the side surfaces opposite to each other, but the disclosure is not limited thereto. For example, the drain port 43 and the suction port 44 may be formed on the same surface.

The drain portions 23 and 80 of the urea water tank 20 and the fuel tank 30 are disposed on the left side of the fuel tank 30, but the disclosure is not limited to this. The drain portions 23 and 80 may be disposed on any one of the front side, the rear side, the left side, and the right side of the fuel tank 30. For example, the positional relationship between the drain portions 23 and 80 and the fuel tank 30 may be appropriately changed according to the positional relationship between the fuel tank 30 and the tractor 1. Specifically, when the fuel tank 30 is disposed on the right side of the tractor 1, the drain portions 23 and 80 may be disposed on the right side of the fuel tank 30. When the fuel tank 30 is disposed on the rear side of the tractor 1, the drain portions 23 and 80 may be disposed on the rear side of the fuel tank 30.

Further, the drain portions 23 and 80 of the urea water tank 20 and the fuel tank 30 are disposed on the front side of the step 13, but the disclosure is not limited to this. For example, the drain portions 23 and 80 may be disposed on the right side or the rear side of the step 13.

The drain portions 23 and 80 of the urea water tank 20 and the fuel tank 30 are disposed such that the vertical position, the lateral position, and the front-rear position are shifted from each other, but the disclosure is not limited to this. The drain portions 23 and 80 may be disposed to be appropriately positioned in accordance with the shapes and arrangements of the urea water tank 20 and the fuel tank 30. For example, the drain portions 23 and 80 may be disposed such that the positions in the front-rear direction are aligned (overlap in side view).

The drain portions 23 and 80 of the urea water tank 20 and the fuel tank 30 are disposed outside the cabin 10, but the positional relationship with the cabin 10 is not limited to this. For example, the drain portions 23 and 80 may be disposed inside (for example, below) the cabin 10.

The drain portion 80 of the fuel tank 30 is configured to fasten the drain plug 85 to the receiving member 82, but the disclosure is not limited to this. The drain plug 85 may be fastened directly to the drain port 43.

The notch 61 is formed to have a substantially U-shape in bottom view, but the shape of the notch 61 is not limited to this as long as the notch 61 is open to the third left side surface 40*c*. For example, the notch 61 may have a substantially triangular shape in bottom view.

The notch 61 is formed to be recessed to the right side (enter the lateral inside) from the left side surface (third left side surface 40*c*) of the fuel tank body 40, but the disclosure is not limited thereto. The notch 61 may be formed to protrude to the left side (lateral outside) with respect to the left side surface of the fuel tank body 40. In this case, for example, a protrusion protruding to the left side may be formed on the left side surface of the fuel tank body 40, and the notch 61 may be formed in the protrusion.

The notch 61 is disposed on the lateral inside of the rear wheel 7, but the disclosure is not limited thereto. For example, the notch 61 may be disposed on the lateral outside of the rear wheel 7.

The notch 61 is formed on the third left side surface 40*c*, but the disclosure is not limited thereto. The notch 61 may be formed on the first left side surface 40*a* or the second left side surface 40*b*. Further, the notch 61 may be formed on the right side surface of the fuel tank 30.

The shape of the recess 62 is not limited to this embodiment, and may be any shape.

The second fixed portion 60 may be provided with at least the notch 61 and is not necessarily provided with the recess 62.

The second fixing portion 120 is configured to fasten the bolt 124 to the nut 14*a* placed on the mounting frame 14 from above, but the positional relationship between the bolt 124 and the nut 14*a* is not limited to this. For example, the nut 14*a* may be fixed to the upper surface of the washer 123, and the bolt 124 may be fastened to the nut 14*a* from the lower side of the mounting frame 14.

The second fixing portion 120 sandwiches the fuel tank 30 vertically (up and down), but the direction of sandwiching the fuel tank 30 is not limited to this. For example, like the first fixing portion 110, the second fixing portion 120 may sandwich the fuel tank 30 horizontally (laterally).

The configuration of the second fixing portion 120 is not limited to this embodiment as long as the second fixing portion 120 can sandwich the fuel tank 30. For example, as in the first fixing portion 110, the second fixing portion 120 may sandwich the fuel tank 30 by the shaft member 111, the disk member 112, the washer 113, and the bolt 114.

What is claimed is:

1. A fuel tank of a work vehicle comprising:
   a bottom surface of the fuel tank;
   a space formed by a first recess extending below the bottom surface of the fuel tank;
   a drain port which is open to an outside of the fuel tank on a substantially vertical portion of a side surface of the fuel tank extending between a top and a bottom of the fuel tank and through which drain port fuel is discharged to the outside by gravity, wherein a portion of the drain port is arranged at a level below the bottom surface of the fuel tank and an other portion of the drain port is arranged at a level above the bottom surface of the fuel tank when the fuel tank is fixed to the work vehicle, such that the drain portion directly communicates with a portion of the space formed by the first recess that is below the bottom surface of the fuel tank;
   a suction port which is open to the outside on another substantially vertical side portion of the side surface extending between a top and a bottom of the fuel tank and has a center positioned lower than a center of the drain port and through which the fuel is sucked by an engine;
   the first recess is formed to be recessed downward with respect to a bottom surface and communicates with the drain port; and
   a second recess which is formed to be recessed downward with respect to the bottom surface and communicates with the suction port;
   wherein a center of the drain port is positioned at substantially the same height as the bottom surface.

2. The fuel tank of the work vehicle as claimed in claim 1, wherein
   the center of the suction port is positioned at a position lower than the bottom surface.

3. The fuel tank of the work vehicle as claimed in claim 1, wherein
   the first recess and the second recess communicate with each other so as not to generate a step on lower surfaces.

4. The fuel tank of the work vehicle as claimed in claim 3, wherein
   a lower surface of the first recess and a lower surface of the second recess are formed to be parallel to a horizontal direction.

5. The fuel tank of the work vehicle as claimed in claim 1, wherein
   the drain port and the suction port are formed on opposite side surfaces.

6. A work vehicle comprising the fuel tank as claimed in claim 1.

7. The work vehicle as claimed in claim 6, wherein
   the work vehicle includes a vehicle body and the vehicle body includes a front side, a rear side, and two longitudinal sides extending between the front side and the rear side;
   the fuel tank further includes a fuel drain portion which is connected to the drain port, is capable of discharging fuel to the outside, and is disposed on a surface of the fuel tank that is parallel to one of the longitudinal sides of the work vehicle, and
   the work vehicle further includes a urea water tank which is capable of discharging urea water to the outside and has a urea water drain portion disposed at one side of the fuel tank.

8. The work vehicle as claimed in claim 7, wherein
   the fuel drain portion and the urea water drain portion are disposed in front of a step on the one longitudinal side of the vehicle body of the work vehicle disposed on the one side of the fuel tank.

9. The work vehicle as claimed in claim 7, wherein
   the fuel drain portion and the urea water drain portion are disposed such that height positions with reference to a vertical direction of the vehicle body of the work vehicle are different from each other.

10. The work vehicle as claimed in claim 9, wherein
    the urea water drain portion is disposed above the fuel drain portion with reference to the vertical direction of the vehicle body of the work vehicle.

11. The work vehicle as claimed in claim 7, wherein
    the fuel drain portion and the urea water drain portion are disposed such that positions in a right-left direction with reference to the vehicle body of the work vehicle are different from each other.

12. The work vehicle as claimed in claim 11, wherein
    the urea water drain portion is disposed on a lateral outside with reference to the right-left direction of the vehicle body of the work vehicle from the fuel drain portion.

13. The work vehicle as claimed in claim 7, wherein
    the fuel drain portion and the urea water drain portion are disposed such that positions in a front-rear direction with reference to the vehicle body of the work vehicle are different from each other.

14. The work vehicle as claimed in claim 7, wherein
    the urea water drain portion is disposed in front of the fuel drain portion with reference to the front-rear direction of the vehicle body of the work vehicle.

15. The work vehicle as claimed in claim 7, wherein
    the urea water drain portion is provided such that other members constituting the work vehicle do not intervene below with reference to a vertical direction of the vehicle body of the work vehicle.

16. The work vehicle as claimed in claim 7, wherein
    the fuel drain portion is disposed below the urea water tank with reference to a vertical direction of the vehicle body of the work vehicle and is disposed so as not to overlap with the urea water drain portion in bottom view with reference to the vehicle body of the work vehicle.

17. The work vehicle as claimed in claim 7, wherein
    the fuel drain portion is disposed on a surface of the fuel tank facing a lateral outside with reference to the left right direction of the vehicle body of the work vehicle.

* * * * *